United States Patent
Wang et al.

(10) Patent No.: US 11,960,534 B2
(45) Date of Patent: Apr. 16, 2024

(54) COORDINATION OF OVERLAPPING PROCESSING OF AUDIO QUERIES

(71) Applicant: Google LLC, Mountain View, CA (US)

(72) Inventors: Bo Wang, San Jose, CA (US); Smita Rai, Saratoga, CA (US); Max Ohlendorf, Mountain View, CA (US); Venkat Kotla, Cupertino, CA (US); Chad Yoshikawa, Menlo Park, CA (US); Abhinav Taneja, Cupertino, CA (US); Amit Agarwal, Sunnyvale, CA (US); Chris Ramsdale, Palo Alto, CA (US); Chris Turkstra, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/341,763

(22) PCT Filed: Apr. 8, 2019

(86) PCT No.: PCT/US2019/026321
§ 371 (c)(1),
(2) Date: Apr. 12, 2019

(87) PCT Pub. No.: WO2019/212697
PCT Pub. Date: Nov. 7, 2019

(65) Prior Publication Data
US 2021/0334306 A1 Oct. 28, 2021

Related U.S. Application Data

(60) Provisional application No. 62/666,681, filed on May 3, 2018.

(51) Int. Cl.
*G06F 16/63* (2019.01)
*G06F 16/632* (2019.01)
(Continued)

(52) U.S. Cl.
CPC ......... *G06F 16/634* (2019.01); *G06F 16/638* (2019.01); *G06F 21/6218* (2013.01)

(58) Field of Classification Search
CPC .................................................. G06F 16/634
See application file for complete search history.

(56) References Cited

U.S. PATENT DOCUMENTS 6,484,155 B1 11/2002 Kiss et al.
10,602,276 B1 * 3/2020 Kirsch ............... G10L 21/0216
(Continued)

FOREIGN PATENT DOCUMENTS

CN 1473324 2/2004
CN 1514995 7/2004
(Continued)

OTHER PUBLICATIONS

European Patent Office; Examination Report issued in Application No. 19719040.8; 9 pages; dated Apr. 16, 2021.
(Continued)

*Primary Examiner* — Mohammad S Rostami
(74) *Attorney, Agent, or Firm* — Gray Ice Higdon

(57) ABSTRACT

Coordinating processing of audio queries is provided. A system receives a query. The system provides the query to a first digital assistant component and a second digital assistant component for processing. The system receives a first response to the query from the first digital assistant component, and a second response to the query from the second digital assistant component. The first digital assistant component can be authorized to access a database the second digital assistant component is prohibited from accessing. The system determines, based on a ranking decision function, to select the second response to the query from the second digital assistant component. The system provides,
(Continued)

responsive to the selection, the second response from the second digital assistant to a computing device.

17 Claims, 5 Drawing Sheets

(51) Int. Cl.
*G06F 16/638* (2019.01)
*G06F 21/62* (2013.01)

(56) References Cited

U.S. PATENT DOCUMENTS

| | | | |
|---|---|---|---|
| 2011/0184730 A1* | 7/2011 | LeBeau | G10L 15/30 704/235 |
| 2012/0078889 A1* | 3/2012 | Chu-Carroll | G06F 16/248 707/723 |
| 2014/0164322 A1* | 6/2014 | Beaurepaire | G01C 21/3688 707/610 |
| 2014/0214814 A1 | 7/2014 | Sankar et al. | |
| 2014/0244712 A1 | 8/2014 | Walters et al. | |
| 2014/0274203 A1* | 9/2014 | Ganong, III | H04M 1/724 455/563 |
| 2014/0365880 A1* | 12/2014 | Bellegarda | G06F 16/90324 715/261 |
| 2015/0039319 A1* | 2/2015 | Mei | G10L 15/1822 704/275 |
| 2016/0378747 A1* | 12/2016 | Orr | G10L 15/26 704/9 |
| 2017/0242860 A1* | 8/2017 | Souche | G06F 16/24578 |
| 2017/0357480 A1* | 12/2017 | La Placa | G06Q 40/06 |
| 2017/0372703 A1* | 12/2017 | Sung | G10L 15/22 |
| 2018/0293484 A1* | 10/2018 | Wang | G06F 16/632 |
| 2018/0301147 A1* | 10/2018 | Kim | G06F 3/167 |
| 2018/0336269 A1* | 11/2018 | Dobrynin | G06F 9/451 |
| 2018/0341643 A1* | 11/2018 | Alders | G10L 15/1822 |
| 2019/0179959 A1* | 6/2019 | Dechu | G06F 16/68 |
| 2019/0213490 A1* | 7/2019 | White | G06N 5/043 |
| 2019/0237067 A1* | 8/2019 | Friedman | H04R 1/406 |
| 2019/0304447 A1* | 10/2019 | Scavo | G06F 16/637 |
| 2019/0333504 A1* | 10/2019 | Chen | G10L 21/0364 |

FOREIGN PATENT DOCUMENTS

| | | |
|---|---|---|
| CN | 102137085 | 7/2011 |
| CN | 103229120 | 7/2013 |
| CN | 105683961 | 6/2016 |
| CN | 106057205 | 10/2016 |
| CN | 107562789 | 1/2018 |
| EP | 2 355 093 A2 | 8/2011 |
| JP | 2003044088 | 2/2003 |
| JP | 2003528362 | 9/2003 |
| JP | 2003295890 | 10/2003 |
| JP | 2008090545 | 4/2008 |
| JP | 2014182307 | 9/2014 |
| JP | 2017107078 | 6/2017 |
| JP | 2018045190 | 3/2018 |
| WO | 2014020835 | 2/2014 |

OTHER PUBLICATIONS

Intellectual Property India; OfficeAction issued in Application No. 202027050428; 8 pages; dated Jun. 21, 2021.
Foreign Search Report on PCT Appl. Ser. No. PCT/US2019/026321 dated Jul. 4, 2019 (14 pages).
Japense Patent Office; Notice for Reasons for Rejection issued in Application No. 2021-512359; 13 pages; dated Dec. 6, 2021.
Japenese Patent Office; Notice of Allowance issued in app. No. 2021-512359, 3 pages, dated Jul. 4, 2022.
Korean Intellectual Property Office; Notice of Office Action issued in Application No. 10-2020-7034786, 16 pages, dated Jan. 10, 2022.
Korean Intellectual Property Office; Decision of Rejection issued in Application No. 10-2020-7034786, 8 pages, dated Aug. 10, 2022.
Intellectual Property India; Hearing Notice issued for Application No. 202027050428, 2 pages, dated Sep. 1, 2023.
China National Intellectual Property Administration; Notification of First Office Action issued in Application No. 201980002176.1, 32 pages, dated Mar. 28, 2023.
European Patent Office; Preliminary Opinion issued for Application No. 19719040.8, 3 pages, dated May 3, 2023.
The Korean Intellectual Property Office; Notice of Office Action issued for Application No. 10-2023-7007207, 13 pages, dated May 12, 2023.
European Patent Office; Summons to attend oral proceedings issued in Application No. 19719040.8; 13 pages; dated Nov. 24, 2022.
European Patent Office; Provision of the minutes issued in Application No. 19719040.8; 7 pages; dated Jun. 13, 2023.
China National Intellectual Property Administration; Notification of Second Office Action issued in Application No. 201980002176.1, 34 pages, dated Oct. 18, 2023.
Korean Intellectual Property Office; Notice of Office Action issued in Application No. 10-2024-7000715; 14 pages; dated Feb. 2, 2024.

* cited by examiner

COORDINATION OF OVERLAPPING PROCESSING OF AUDIO QUERIES

CROSS-REFERENCES TO RELATED APPLICATIONS

This application is a U.S. National Stage under 35 U.S.C. § 371 of International Patent Application No. PCT/US2019/026321, filed on Apr. 8, 2019 and designating the United States, which claims the benefit of priority under 35 U.S.C. § 119 to U.S. Provisional Patent Application No. 62/666,681, filed May 3, 2018 and titled "COORDINATION OF OVERLAPPING PROCESSING OF AUDIO QUERIES," each of which is hereby incorporated by reference herein in its entirety.

BACKGROUND

Excessive network transmissions, packet-based or otherwise, of network traffic data between computing devices can prevent a computing device from properly processing the network traffic data, completing an operation related to the network traffic data, or responding timely to the network traffic data. The excessive network transmissions of network traffic data can also complicate data routing or degrade the quality of the response if the responding computing device is at or above its processing capacity, which may result in inefficient bandwidth utilization. A portion of the excessive network transmissions can include transmissions for requests that are not valid requests.

SUMMARY

At least one aspect is directed to a system to coordinate overlapping processing of audio queries. The system can include a data processing system. The data processing system can include at least one processor and memory. The data processing system can receive, via an interface, one or more data packets including an audio signal detected by a sensor of a computing device. The data processing system can generate a query based on the audio signal received via the one or more data packets. The data processing system can transmit the query to a plurality of digital assistant components. The data processing system can receive a first response to the query from a first digital assistant component of the plurality of digital assistant components. The data processing system can receive a second response to the query from a second digital assistant component of the plurality of digital assistant components. The first digital assistant component can be authorized to access a database the second digital assistant component is prohibited from accessing. The data processing system can determine, based on a ranking decision function, to select the second response from the second digital assistant component instead of the first response from the first digital assistant component. The data processing system can provide, responsive to the selection, the second response from the second digital assistant component to the computing device.

Optionally, the data processing system may be configured to select the second response from the second digital assistant component based on a pre-configured preference established for the second digital assistant component. Optionally, the data processing system may be configured to select the second response from the second digital assistant component based on a confidence score for the second response from the second digital assistant component. Optionally, the data processing system may be configured to determine the first digital assistant component is a preferred digital assistant. The data processing system may be configured to determine that the first response from the first digital assistant component is flagged as a fallback response. The data processing system may be configured to override, responsive to the determination that the first response from the first digital assistant component is flagged as the fallback response, the first digital assistant component. The data processing system may be configured to select the second response from the second digital assistant component. The data processing system may be configured to maintain the first digital assistant component as the preferred digital assistant. Optionally, the data processing system may be configured to: determine a signal for the query; and select the ranking decision function from a plurality of ranking decision functions based on the signal. Optionally, the data processing system may be configured to: determine a signal for the query; and select responses from the second digital assistant component based on the signal. Optionally, the data processing system may be configured to, based on the ranking decision function, select the second response based on the first response being an audio-only response. Optionally, the data processing system may be configured to, based on the ranking decision function, select the second response based on the second digital assistant component accessing data stored in memory of the computing device. Optionally, the first response may comprise one of calendar information or media content. Optionally, the first digital assistant component may be configured to execute independently of the second digital assistant component to generate the first response. Optionally, the data processing system may be configured to transmit the query to each of the plurality of digital assistants via an independent branch to cause the plurality of digital assistants to process the query in an overlapping manner. Optionally, the first digital assistant component may be established by a different administrator from the second digital assistant component. Optionally, the data processing system may be configured to: receive the one or more data packets from the computing device via a streaming speech server configured to convert audio to text. Optionally, the data processing system may be configured to receive the second response from the second digital assistant component prior to the first response from the first digital assistant component. The data processing system may be configured to determine that the second digital assistant component is not a preferred digital assistant component. The data processing system may be configured to determine that the first digital assistant is the preferred digital assistant. The data processing system may be configured to wait, responsive to the determination that the second digital assistant component is not a preferred digital assistant and the first digital assistant is the preferred digital assistant, for the first response from the first digital assistant component. The data processing system may be configured to, upon receipt of the first response from the first digital assistant component, determine that the first response is flagged as a fallback response. The data processing system may be configured to select the second response based on the determination that the second digital assistant component is not the preferred digital assistant and the first response is flagged as the fallback response.

At least one aspect is directed to a method of coordinating overlapping processing of an audio query. The method can be performed by a data processing system comprising at least one processor and memory. The method can include the data processing system receiving one or more data packets including an audio signal detected by a sensor of a computing device. The method can include the data processing system generating a query based on the audio signal received via the one or more data packets. The method can include the data processing system transmitting the query to a plurality of digital assistant components. The method can include the data processing system receiving a first response to the query from a first digital assistant component of the plurality of digital assistant components. The method can include the data processing system receiving a second response to the query from a second digital assistant component of the plurality of digital assistant components. The first digital assistant component can be authorized to access a database the second digital assistant component is prohibited from accessing. The method can include the data processing system determining, based on a ranking decision function, to select the second response from the second digital assistant component instead of the first response from the first digital assistant component. The method can include the data processing system providing, responsive to the selection, the second response from the second digital assistant component to the computing device.

Optionally, the method may comprise selecting the second response from the second digital assistant component based on a confidence score for the second response from the second digital assistant component. Optionally, the method may comprise determining the first digital assistant component is a preferred digital assistant. The method may comprise determining that the first response from the first digital assistant component is flagged as a fallback response. The method may comprise overriding, responsive to the determination that the first response from the first digital assistant component is flagged as the fallback response, the first digital assistant component. The method may comprise selecting the second response from the second digital assistant component. The method may comprise maintaining the first digital assistant component as the preferred digital assistant. Optionally, the method may comprise determining, based on the ranking decision function, to select the first response based on the first digital assistant component accessing data stored in memory of the computing device. Optionally, the method may comprise transmitting the query to each of the plurality of digital assistants via an independent branch to cause the plurality of digital assistants to process the query in an overlapping manner. Optionally, the method may comprise receiving the second response from the second digital assistant component prior to the first response from the first digital assistant component. The method may comprise determining that the second digital assistant component is not a preferred digital assistant component. The method may comprise determining that the first digital assistant is the preferred digital assistant. The method may comprise waiting, responsive to the determination that the second digital assistant component is not a preferred digital assistant and the first digital assistant is the preferred digital assistant, for the first response from the first digital assistant component. The method may comprise, upon receipt of the first response from the first digital assistant component, determining that the first response is flagged as a fallback response. The method may comprise selecting the second response based on the determination that the second digital assistant component is not the preferred digital assistant and the first response is flagged as the fallback response.

At least one aspect is directed to a computer program product configured such that, when executed on a data processing system comprising a processor and memory, causes the data processing system to perform the method of the above aspect. The computer program product may be comprised in or provided on a tangible, non-transient, computer readable medium.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
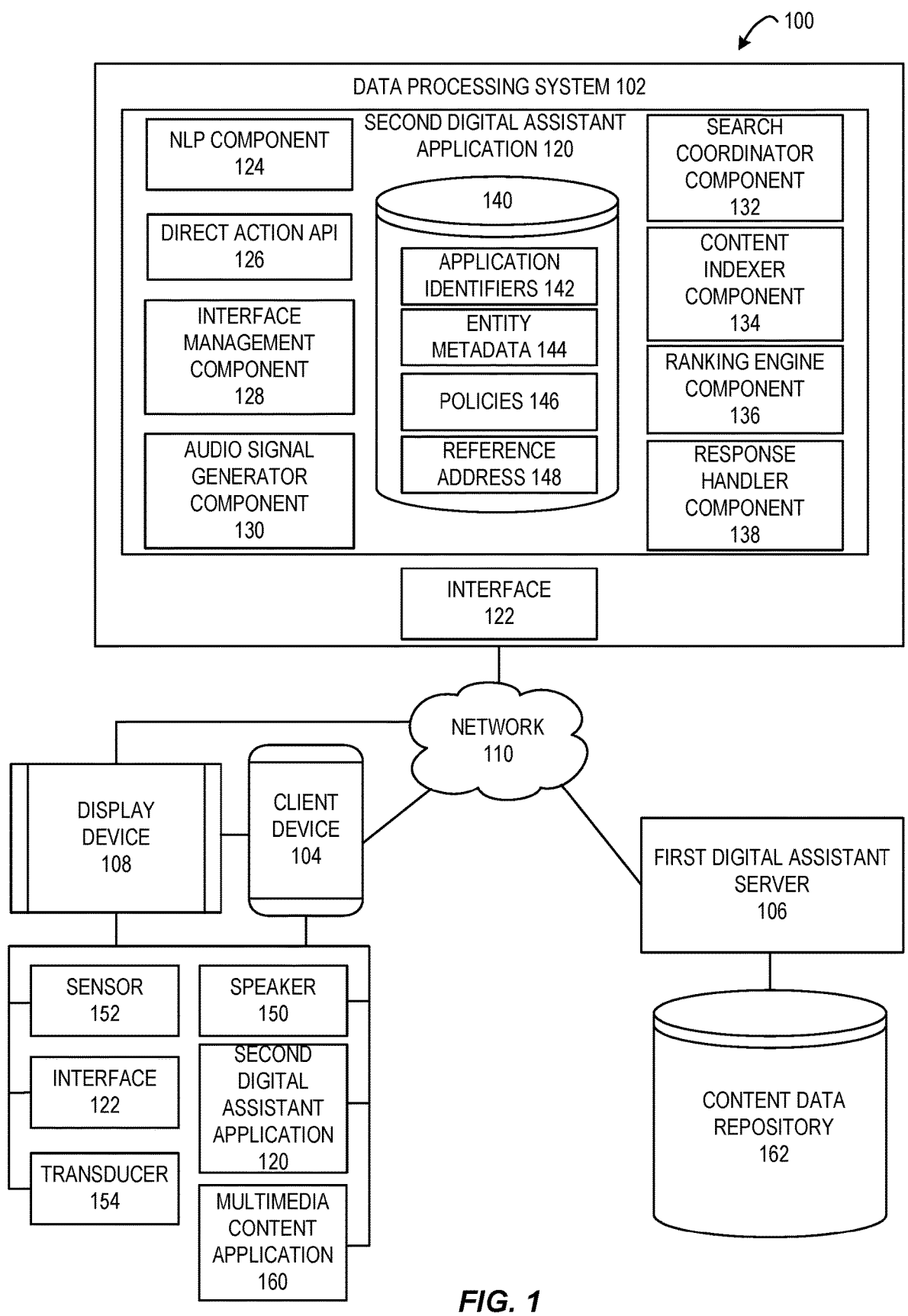
FIG. 1 illustrates an example system to coordinate overlapping processing of audio queries.

Following below are more detailed descriptions of various concepts related to, and implementations of, methods, apparatuses, and systems to coordinate parallel processing of audio queries across multiple devices, such as a data processing system, display devices, and client devices. The various concepts introduced above and discussed in greater detail below may be implemented in any of numerous ways.

Audio queries can be processed by multiple digital assistant components. However, different digital assistant components can generate different results to the audio queries based on the processing techniques used by the respective component, or based on the database access controls established for the different digital assistant components. Further, the different digital assistant components can process and return results at different times. Thus, it can be challenging to coordinate processing of audio queries where different digital assistant components can process the audio query in parallel or an overlapping manner.

Systems and methods of the present technical solution provide for coordination of overlapping processing of audio queries. For example, a computing device can receive an audio query detected by a microphone of the computing device. The computing device, or interface thereof, can forward the audio query to a first digital assistant agent for processing. The interface can forward the audio query to a second digital assistant agent for processing. The first digital assistant can generate at least one first result, while the second digital assistant can generate a second result. The second digital assistant can generate a confidence score for the second result. Responsive to the confidence score, the second digital assistant can override the first digital assistant and determine to return the second result. The second digital assistant can determine that the first result is not yet available, and override the first digital assistant in order to provide the second result.

For example, multiple digital assistant components (e.g., digital assistants, digital assistant agents, or voice agents) can be configured to process, parse, serve or respond to audio queries input by a user via a computing device (e.g., a network connected television, network connected speaker, or other network connected computing device). The systems and methods of the present technical solution provide a framework to arbitrate and prioritize among responding digital assistant agents. For example, after the voice query is transcribed to text by a pre-processor component, the query can be passed to a first digital assistant (e.g., a third-party cloud configured with a third-party digital assistant component) to process the query, while a second digital assistant can process the query in parallel or in an overlapping manner.

One of the digital assistant components, or a separate coordinator component or response handler component, can determine which voice agent to use to provide the response—or which response to use. The coordinate component can be configured with rules, policies, or quality assessment techniques to determine which digital assistant component to use. The second digital assistant component can determine to override the first digital assistant component. The second digital assistant component can determine to override the first digital assistant based on a confidence score, a quality assessment technique, a signal generated from parsing the query, a database used to provide the result, or a domain associated with the query.

For example, a first digital assistant can be configured to process and respond to audio queries that are related to media domain queries such as "play Movie_A on Streaming_Service_A", while a second digital assistant component can be configured to process and respond to search domain queries such as "when is my next appointment". If the search queries signals are ambiguous or fall into multiple categories, then the coordinator component can score or rank the responses from the multiple digital assistant components and select a response from one of the digital assistant component. For example, the coordinator component can score or rank the responses or queries based on a confidence level, or other factors.

Thus, systems and methods of the present technical solution can reduce latency by allowing the first digital assistant component and the second digital assistant component to run in parallel or in an overlapping manner, rather than serially. Latency can be further reduced by selecting the results from the digital assistant that completes processing first. Reliability can be increased by using a ranking decision function to select responses or results from one of the digital assistants. Systems and methods of the present technical solution can reduce dependency on third-party cloud functioning for preferred domains, which may result in more robust performance. For example, if the response from a second digital assistant component is available and indicates the query belongs to a domain preferred by the second digital assistant or administrator thereof, then the second digital assistant component can provide the response without waiting for the first digital assistant component to even return a response, thereby reducing latency or delay in the event the first digital assistant is slower or experiencing a malfunction, error, fault, excessive processing load, or other processing issue. The systems and methods of the present technical solution can provide for fine-tuning of results to confidence scores from either the first digital assistant component or second digital assistant component. The first digital assistant component can report confidence scores of their results with "fallback" results. If the second digital assistant component has a low confidence score relative to a threshold or a confidence score of the first digital assistant component, then the system can decide to return the "fallback" results from the first digital assistant component. If the first digital assistant component indicates that it does not have an answer, then the second digital assistant component can provide the results regardless of the domain or signals associated with the query.

Systems and methods of the present disclosure can provide a way to allow third-party televisions with their own digital assistant agents to integrate with a digital assistant agent provided by a data processing system. The systems and methods can include registering a device model to specify common metadata for the type of devices such as third-party voice agent endpoint the digital assistant component of the data processing system can interact with, any speech biasing phrases and device capabilities such as a browser. The systems and methods can include providing domains in the device model to specify which query domains are preferred to serve such as media queries. The systems and methods can include integrating with digital assistant software development kit ("SDK") application programming interface ("API") enhanced for visual results on televisions. The systems and methods can include integrating with digital assistant SDK out-of-box experience ("OOBE") flow to guide user to sign-in the device. The device bound solution to support OOBE and authentication can be secure.

The model registration API can allow manufacturers of the television or other computing device to specify their cloud natural language understanding ("NLU") endpoints and other syndication specific metadata. The system can provide contextual speech biasing phrases registered with the device model for the data processing system's automatic speech recognition to correctly recognize the common queries uttered on the device. The system can trigger third-party cloud NLU in parallel with building the data processing system's candidate results for optimum latency. The system can provide a ranking layer which takes into account ranking protocols or policies to fulfill queries based on domains. The system can provide a new processing flow to allow responses from a digital assistant component without requiring a sign-in. The system can block content selection for queries where the response is provided by the third-party digital assistant, and perform post processing to scrub such queries from other logs. The system can provide a flow for agent's capability since multiple agents are available on the platform. The system can provide a scalable visual solution to render HTML5 on third-party devices so that any device with browser can show a visual result and can support interactive elements such as suggestion clicks or links.

FIG. 1 illustrates an example system 100 to coordinate parallel processing of audio queries across multiple devices. The system 100 can include at least one data processing system 102, at least one first digital assistant server 106, one or more client devices 104, one or more display devices 108, and a network 110. A display device 108 can be coupled to the client device 104 via wire or wireless connection (e.g., through the network 110, short-range communications, or pairing). The client device 104 can be a part of the display device 108, or otherwise be integrated into the display device. The at least one data processing system 102, one or more client devices 104, and one or more display devices 108 can be communicatively coupled to one another via the network 110.

The data processing system 102 can include an interface 122. The data processing system 102 can include a second digital assistant application 120. The data processing system 102 can include a natural language processor (NLP) component 124 to parse audio-based inputs. The data processing system 102 can include an interface management component 128 to detect and manage the interfaces of other devices in the system 100. The data processing system 102 can include an audio signal generator component 130 to generate audio-based signals. The data processing system 102 can include a direct action application programming interface (API) 126 to fulfill requests parsed from audio-based inputs. The data processing system 102 can include an audio signal generator component 130 to select responses to audio-based input signals. The data processing system 102 can include a data repository 140. The data processing system 102 can include a search coordinator component 132, a content indexer component 134, a ranking engine 136, and a response handler component 138. The NLP component 124, the interface management component 128, the audio signal generator component 130, the data repository 140, the direct action API 126, the interface management component 128, the search coordinator component 132, the content indexer component 134, the ranking engine 136, and the response handler component 138 can form the digital assistant application 120.

The functionalities of the data processing system 102, such as the digital assistant application 120, can be included or otherwise be accessible from the one or more client devices 104 and the one or more display devices 108. The functionalities of the data processing system 102 may correspond to the functionalities or interface with the digital assistant application 120 executing on the client devices 104 or the display devices 108. The client devices 104 and the display devices 108 can each include and execute a separate instance of the one or more components of the digital assistant application 120. The client devices 104 and the display devices 108 can otherwise have access to the functionalities of the components of the digital assistant application 120 on a remote data processing system 102 via the network 110. For example, the display device 108 can include the functionalities of the NLP component 124 and access the remainder of the components of the digital assistant application 120 via the network 110 to the data processing system 102. The data processing system 102, the client device 104, and the display device 108 can include and execute a separate instance of the components of the digital assistant application 120. The digital assistant application 120 accessible or executing on the client devices 104 and the display devices 108 may each have different functionalities. The client device 104 or the display device 108 can execute a second digital assistant application 120 that interfaces with the data processing system 102. The data processing system 102 can interface with the first digital assistant server 106.

The client devices 104 and the display devices 108 can each include at least one logic device such as a computing device having a processor to communicate with each other with the data processing system 102 via the network 110. The client devices 104 and the display devices 108 can include an instance of any of the components described in relation to the data processing system 102. The client devices 104 can include a desktop computer, laptop, tablet computer, personal digital assistant, smartphone, mobile device, portable computer, thin client computer, virtual server, a speaker-based digital assistant, or other computing device. The display device 108 can include a smart television, a hybrid television, a connected television, a set-top box connected to a television, a digital video record, monitor, screen, or other computing device with display functionality. The client devices 104 can be communicatively coupled with the display devices 108. For example, once paired, a client device 104 may function as a remote control to control various functionalities at the display device 108. The client devices 104 can be a part of or integrated with the display device 108.

The components of the system 100 can communicate over a network 110. The network 110 can include, for example, a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, an NFC (Near-Field Communication) network, a local area network (LAN), a wireless network or a wireline network, and combinations thereof. The network 110 can include a wireless link, such as an infrared channel or satellite band. The topology of the network 110 may include a bus, star, or ring network topology. The network 110 can include mobile telephone networks using any protocol or protocols used to communicate among mobile devices, including advanced mobile phone protocol (AMPS), time division multiple access (TDMA), code-division multiple access (CDMA), global system for mobile communication (GSM), general packet radio services (GPRS), or universal mobile telecommunications system (UMTS). Different types of data may be transmitted via different protocols, or the same types of data may be transmitted via different protocols.

The network 110 can include a short-range communication link (e.g., ranging up to 30 meters) established between the client devices 104 and the display devices 108, using Bluetooth, Bluetooth Low Energy, Dedicated Short-Range Communications (DSRC), or Near-Field Communications (NFC) protocols. Using such protocols, the data processing system 102 can establish a communication link with one or more client devices 104 via the interface 122. The data processing system 102 can establish a communication link with one or more display devices 108 via the interface 122. The short-range communication link may be established between the client devices 104 and the display devices 108 via pairing protocol.

The client devices 104 can include sensors 152, speakers 150, interfaces 122, and transducers 154. The display devices 108 can include sensors 152, speakers 150, interfaces 122, and transducers 154. The client devices 104 and the display device 108 can include at least one sensor 152, at least one transducer 154, at least one audio driver, and at least one speaker 150. The sensor 152 can include a microphone or audio input sensor. The sensor 152 can include at least one of a GPS sensor, proximity sensor, ambient light sensor, temperature sensor, motion sensor, accelerometer, or gyroscope. The sensor can include an occupancy or weight sensor. The transducer 154 can convert the audio input into an electronic signal. The audio driver can include a script or program executed by one or more processors of the client devices 104 or the display device 108 to control the speaker 150. The speaker 150 can render audio signals by converting electrical signals into audible waves. The client device 104 and the display device 108 can each include peripheral devices, such as a keyboard, a pointing device, a monitor (built-in or independent), and headphones, among other devices.

The client devices 104 and the display device 108 can each execute an instance of a multimedia content application 160. The multimedia content application 160 can be associated with a particular first digital assistant server 106. The multimedia content application 160 can include a script or a program installed at the client device 104 or the display device 108. The multimedia content application 160 can include a script or a program executable via another application installed at the client device 104 or the display device 108, such as a web browser. The multimedia content application 160 can include an application programming interface (API) that can allow other applications (e.g., the digital assistant application 120) at the client device 104 or the display device 108 to interface with the multimedia content application 160. The multimedia content application 160 can play, stream, download, or otherwise access multimedia content. The multimedia content may correspond to one or more audiovisual content files in any format, such as MP3, ACC, OPUS, RTMP, RTP, MP4, FLV, WebM, ASF, ISMA, HEVC, H.264, VP8, VP9, HLS, HDS, and SMIL, among others. The one or more audiovisual content files can include audio and/or visual content for play at the client device 104 or the display device 108. Upon loading of the one or more audiovisual content files, the multimedia content application 160 can play or stream the multimedia content on the client device 104 or the display device 108.

The multimedia content application 160 can perform an authentication process with the first digital assistant server 106. The authentication process can include identification of an account identifier and an access code at the client device 104 or the display device 108 via input or retrieval from storage. Upon receipt, the multimedia content application 160 can send the account identifier and the access code to the first digital assistant server 106. The first digital assistant server 106 in turn can compare its own stored access code for the account identifier with the access code received from the client device 104 or the display device 108. Responsive to determining a match between the two access codes, the first digital assistant server 106 can send a successful authentication indicator to the client device 104 or the display device 108.

Responsive to receipt of the successful authentication indicator, the multimedia content application 160 can retrieve a catalog of available multimedia content made available by the first digital assistant server 106 for the account identifier. The multimedia content application 160 can display the catalog of available multimedia content in a graphical user interface with each element corresponding to each available multimedia content. Upon interaction with one of the elements of the graphical user interface, the multimedia content application 160 can send a request for the selected multimedia content to the first digital assistant server 106. The first digital assistant server 106 can identify and provide the one or more audiovisual content files corresponding to the selected multimedia content. The multimedia content application 160 in turn can store, play, or stream the one or more audiovisual content files corresponding the selected multimedia content at the client device 104 or the display device 108. Additional details regarding the functionality of the first digital assistant server 106 and the multimedia content application 160 in the context of system 100 are explained herein.

An application, script, program, or other components that are associated with the data processing system 102 can be installed at the client devices 104 or the display device 108. The application can enable the client devices 104 or display device 108 to communicate input audio signals (and other data) to the interface 122 of the data processing system 102. The application can enable the client devices 104 and the display device 108 to drive components of the client devices 104 and the display device 108 to render the output audio signals.

The client devices 104 and the display device 108 can be associated with an end user that enters voice queries as input audio signals into the client devices 104 or the display device 108 (via the sensor 152) and receives audio output in the form of a computer generated voice that can be provided from the data processing system 102. In response to the input audio signals, the client devices 104 and the display device 108 can receive action data structures to perform predetermined functions or actions. The interface 122 can receive or provide data messages to the direct action API 126 of the data processing system 102 and enable communication between the components of the system 100. The client devices 104 and the display device 108 can include a user interface that enables a user to interact with the components of the system 100.

The data processing system 102 can include at least one server having at least one processor. For example, the data processing system 102 can include a plurality of servers located in at least one data center or server farm. The data processing system 102 can determine from an audio input signal a request and a trigger keyword associated with the request. Based on the request and trigger keyword, the data processing system 102 can generate or select response data. The response data can be audio-based or text-based. For example, the response data can include one or more audio files that, when rendered, provide an audio output or acoustic wave. The data within the response data can be referred to as content items. The response data can include other content (e.g., text, video, or image content) in addition to audio content. The response data can include various types of content, such as calendar information, messages, weather information, news information, or ticket information.

The data processing system 102 can include multiple, logically grouped servers and facilitate distributed computing techniques. The logical group of servers may be referred to as a data center, server farm, or a machine farm. The servers can be geographically dispersed. A data center or machine farm may be administered as a single entity, or the machine farm can include a plurality of machine farms. The servers within each machine farm can be heterogeneous—one or more of the servers or machines can operate according to one or more type of operating system platform. The data processing system 102 can include servers in a data center that are stored in one or more high-density rack systems, along with associated storage systems, located for example in an enterprise data center. In this way, the data processing system 102 with consolidated servers can improve system manageability, data security, the physical security of the system, and system performance by locating servers and high performance storage systems on localized high performance networks. Centralization of all or some of the data processing system 102 components, including servers and storage systems, and coupling them with advanced system management tools allows more efficient use of server resources, which saves power and processing requirements and reduces bandwidth usage. Each of the components of the data processing system 102 can include at least one processing unit, server, virtual server, circuit, engine, agent, appliance, or other logic device such as programmable logic arrays configured to communicate with the data repository 140 and with other computing devices.

The data processing system 102 can include the data repository 140. The data repository 140 can include one or more local or distributed databases and can include a database management system. The data repository 140 can include computer data storage or memory and can store one or more application identifiers 142, one or more entity metadata 144, one or more ranking policies 146, and at least one reference address 148. Each application identifier 142 may be an alphanumeric value corresponding to a multimedia content application 160 to be executed on the client device 104 or the display device 108. Each entity metadata 144 can correspond to an entity. Each reference address 148 can identify or reference. Details of the use and functionalities of the one or more application identifiers 142, one or more entity metadata 144, one or more ranking policies 146, and the reference address 148 are provided below.

The data repository 140 can include computer data storage or memory and can store one or more parameters, one or more policies, response data, and templates, among other data. The parameters, policies, and templates can include information such as rules about a voice based session between the client devices 104, the data processing system 102, and the display device 108. The parameters, policies, and templates can include information for another digital assistant application 120 received via the interface 122 from another source (e.g., the data processing system 102, the client devices 104, and the display devices 108). For example, the parameters, policies, and templates stored in the data repository 140 of a digital assistant application 120 hosted on a client device 104 or a display device 108 can include the parameters, policies, and templates from the data repository 140 of a digital assistant application 120 accessible via the client device 104 and the display device 108, and vice-versa. In this manner, the parameters, policies, and templates of different digital assistant applications 120 may be shared and used by one another. The response data can include content items for audio output or associated metadata, as well as input audio messages that can be part of one or more communication sessions with the client devices 104 and the display devices 108.

The NLP component 124 can receive input audio signals. The data processing system 102 can receive the input audio signal from the client devices 104 or the display device 108 (e.g., via the transducers 154 or the sensors 152) included in a data packet. The data packet can include a device identifier associated with the client device 104 or the display device 108. The data packet can include an application identifier of the multimedia content application 160 executable at the client device 104 or the display device 108. The functionalities of the NLP component 124 can be split among the data processing system 102, the client device 104, and the display device 108. For example, the NLP component 124 executing on the client device 104 or the display device 108 can package the input audio signal detected at the sensors 152 into a data packet, and can send the data packet to the data processing system 102 for further processing at the NLP component 124 executed at the data processing system 102.

The NLP component 124 can convert input audio signals into recognized text by comparing the input audio signal against a stored, representative set of audio waveforms and choosing the closest matches. The representative waveforms can be generated across a large set of input audio signals. Once the input audio signal is converted into recognized text, the NLP component 124 can match the text to words that are associated, for example, via a learning phase, with actions or output audio signals.

From the input audio signal, the NLP component 124 can identify at least one request. The request can indicate intent or subject matter of the input audio signal. The request can indicate a type of action likely to be taken. For example, the NLP component 124 can parse the input audio signal to identify at least one request to play multimedia content (e.g., "Okay, play Bat Movie from 2015"). The request can include at least one word, phrase, root or partial word, or derivative indicating an action to be taken. The request can include a trigger keyword, such "okay" or "go." The NLP component 124 can detect the trigger keyword in the request. Responsive to the detection of the trigger keyword, the NLP component 124 can identify the intent, the subject matter, and the type of action to be taken from the input audio signal.

The NLP component 126 can identify at least one entity from the request. The at least one entity can correspond to the at least one word, phrase, root or partial word, or derivative in the request. The at least one entity may include a descriptor for a multimedia content, such as a title, an author, a distributor, an original release date, a language, a genre, a time length, and other associate keywords (e.g., actor names). For example, the entity for "Bat Movie I" film released in 2005 may include: "Bat Movie I" as the title, "Ms. Director" as the author, "Jun. 15, 2005" as the original release date, "English" as the language, "Action" as the genre, and "140 minutes" as the length, among other information. The NLP component 126 can determine that the at least one word, phrase, root or partial word, or derivative in the request corresponds to at least one entity. To perform the determination, the NLP component 126 can access a semantic knowledge graph. The semantic knowledge graph can specify a set of words, phrases, root or partial words, or derivatives relating to the at least one entity. The semantic knowledge graph can include nodes connected to one another via edges. Nodes may be associated with a word, phrase, root or partial word, or a derivative, and may be marked related to at least one entity or unrelated. Each edge connecting two nodes can represent a relationship between the two. Continuing from the previous example, a node for "Bat Movie" in the semantic knowledge graph may be marked as related to an entity and can have edges to a node labeled "Bat Movie I" also labeled as related to an entity indicating a relationship between the two terms. Using the semantic knowledge graph, the NLP component 126 can determine that the at least one word, phrase, root or partial word, or derivative in the request corresponds to the at least one entity.

The NLP component 124 can determine whether the at least one request corresponds to a query for multimedia content based on the entity. Responsive to the identification that the at least one word, phrase, root or partial word, or derivative in the request corresponds to the at least one entity, the NLP component 124 can determine that the at least one request corresponds to the query for multimedia content. Responsive to the identification that none of the words, phrases, root or partial words, or derivatives in the request correspond to the at least one entity, the NLP component 124 can determine that the at least one request does not correspond to the query for multimedia content. The determination that the at least one request corresponds to the query for multimedia content can trigger the functionalities of the search coordinator component 132, the content indexer component 134, the ranking 136, and the response handler component 138, as detailed below.

The audio signal generator component 130 can obtain information from the data repository 140 where it can be stored as part of the response data. The audio signal generator component 130 can query the data repository 140 to select or otherwise identify response phrases or content items, e.g., from the response data. The audio signal generator component 130 can generate or otherwise obtain an output signal that includes the content item. The data processing system 102 can execute the audio signal generator component 130 to generate or create an output signal corresponding to the content item or request. For example, once a request is fulfilled, the audio signal generator component 130 can generate an audio output signal that includes the phrase "The action was completed."

The interface 122 can be a data interface or a network interface that enables the components of the system 100 to communicate with one another. The interface 122 of the data processing system 102 can provide or transmit one or more data packets that include the action data structure, audio signals, or other data via the network 110 to the client devices 104 or display device 108. For example, the data processing system 102 can provide the output signal from the data repository 140 or from the audio signal generator component 130 to the client devices 104. The data processing system 102 can instruct, via data packet transmissions, the client devices 104 or the display device 108 to perform the functions indicated in the action data structure. The output signal can be obtained, generated, transformed to, or transmitted as one or more data packets (or other communications protocol) from the data processing system 102 (or other computing device) to the client devices 104 or the display device 108.

The direct action API 126 of the data processing system 102 can generate, based on, for example, the request, action data structures. The action data structure can include data or instructions for the execution of a specified action to satisfy the request. In some implementations, the action data structure can be a JSON formatted data structure or an XML formatted data structure.

Depending on the action specified in the request, the direct action API 126 can execute code or a dialog script that identifies the parameters required to fulfill the request. The action data structures can be generated responsive to the request. The action data structure can be included in messages that are transmitted to or received by the client devices 104 or the display device 108. The direct action API 126 can package the request into an action data structure for transmission to the display device 108. The direct action API 126 can access a device identifier from the response data to determine which the client device 104 or the display device 108 is associated with the user that generated the request. Once received, the display device 108 can process the action data structure and can perform the indicated action. The direct action API 126 can package the request into an action data structure for execution by the client device 104 or the display device 108. Once received, the client device 104 can process the action data structure using the digital assistant application 120 or one or more applications running on the client device 104.

The action data structure can include information for completing the request. For example, the action data structure can be an XML or JSON formatted data structure that includes attributes used in completing or otherwise fulfilling the request. The attributes can include a location of the display device 108, a location of the client devices 104, an authorization level of a user associated with a client device 104, a device identifier, an interface identifier, a vehicular state, or a request state. In some implementations, the request state includes one or more attributes that should be satisfied before the action is fulfilled. For example, with the request "Ok, change the song," the request state may have the attribute {requestor: [authorized, passenger]}, which can indicate that the request should be an explicitly authorized user.

The direct action API 126 can retrieve a template from the data repository 140 to determine which fields or attributes to include in the action data structure. The direct action API 126 can determine necessary parameters and can package the information into an action data structure. The direct action API 126 can retrieve content from the data repository 140 to obtain information for the attributes of the data structure.

The direct action API 126 can populate the fields with data from the input audio signal. The direct action API 126 can populate the fields with data from the client devices 104 or the display device 108, or from another source. The direct action API 126 can prompt a user for additional information when populating the fields. The templates can be standardized for different types of actions, responding to messages, and performing functions within the client device 104 or the display device 108. The action data structure can initially be generated by a direct action API 126 executed by a remote data processing system 102. The remote data processing system 102 can transmit the action data structure to the client device 104 or the display device 108, which can add fields and attributes to the action data structure.

The direct action API 126 can obtain response data (or parameters or policies) from the data repository 140, as well as data received with end user consent from the client devices 104 or the display devices 108. The response data (or parameters or policies) can be included in the action data structure. When the content included in the action data structure includes end user data that is used for authentication, the data can be passed through a hashing function before being stored in the data repository 140.

The data processing system 102 can include, interface, or otherwise communicate with the search coordinator component 132. The search coordinator component 132 can generate a query command to send to the client device 104 or the display device 108. The generation of the query command by the search coordinator component 132 can be in response to the determination at the request corresponds to the query for multimedia content. The query command can include the entity identified from the response. The query command can include instructions for the client device 104 or the display device 108 to process the query command. The instructions may indicate which multimedia content application 160 on the client device 104 or the display device 108 is to perform a search for the entity. To generate the instructions, the search coordinator component 132 can access the data repository 140 to identify the one or more application identifiers 142 to include in the query command. The data repository 140 can identify the one or more application identifiers 142 by the device identifier associated with the client device 104 or the display device 108. Each application identifier 142 may be labeled by a frequency of use by the client device 104 or the display device 108. The search coordinator component 132 can insert the one or more application identifiers 142 in the initial data packet into the instructions of the query command. The search coordinator component 132 can identify a subset of application identifiers 142 for the client device 104 and the display device 108 based on the frequency of usage by the client device 104 and the display device 108. For example, the search coordinator component 132 can identify that the display device 108 uses multimedia content applications 160 "A" and "B" more frequently than multimedia content applications 160 "C", "D", and "E." In this example, the search coordinator component 132 can select the application identifiers 142 corresponding to the multimedia content applications 160 for insertion into the query command. Each application identifier 142 of the query command can indicate which multimedia content application 160 on the client device 104 or the display device 108 is to perform the search for the entity. Subsequent to the generation of the query command, the search coordinator 132 can transmit the query command to the client device 104 or the display device 108.

Receipt of the query command can cause the client device 104 or the display device 108 to the multimedia content application 160 to perform the search for the entity. Responsive to receipt of the query command, the client device 104 or the display device 108 can parse the query command to identify the entity. The client device 104 or the display device 108 can parse the query command to identify the one or more application identifiers 142. The client device 104 or the display device 108 can identify the multimedia content applications 160 corresponding to the one or more application identifiers 142 of the query command. The client device 104 or the display device 108 can initiate execution of the multimedia content application 160 identified from the one or more application identifiers 142 of the query command. To perform the search, the client device 104 or the display device 108 can provide the at least one entity in the query command to each multimedia content application 160 via the application programming interface for the multimedia content application 160. Once the entity is provided, each multimedia content application 160 can send a query request to the associated first digital assistant server 106.

In parallel to the generation and sending of the query command to the client device 104 or the display device 108, the search coordinator component 132 can generate a query request to send to the first digital assistant server 106. The generation of the query request by the search coordinator component 132 can be in response to the determination at the request corresponds to the query for multimedia content. The generation of the query request by the search coordinator component 132 can be in response to an invocation by the content indexer component 134, as will be discussed below. The query request can include the entity identified from the response. The query request can include instructions for the first digital assistant server 106 to process the query request. The search coordinator 132 can identify which multimedia content providers to send the query requests from the one or more application identifiers 142 for the client device 104 or the display device 108. Subsequent to the generation of the query request, the search coordinator 132 can transmit the query request to the first digital assistant server 106.

Receipt of the query request from the client device 104, the display device 108, or the search coordinator component 132 can cause the first digital assistant server 106 to perform the search for the entity. As the client device 104 or the display device 108 may have initialized the multimedia content application 160 to send the query request, the query request from the client device 104 or the display device 108 may be received subsequent to the query request from the search coordinator component 132. The first digital assistant server 106 can access a content data repository 162 in response to the query request. The content data repository 162 can include one or more entity metadata 144 and one or more ranking policies 146. Each entity metadata 144 can correspond to an entity. Each entity metadata 144 on the data repository 162 can include one or more entries about the multimedia content corresponding to the entity, such as the title, author, distributor, original release date, language, genre, time length, and other associated keywords. For example, one entity metadata 144 can correspond to "Bat Movie I" and another entity metadata 144 can correspond to "Bat Movie II." Each entity metadata 144 can be associated with a reference address 148 (e.g., a Uniform Resource Locator). The reference address 148 may include a hostname, a file pathname, and a query parameter. The hostname can correspond to the first digital assistant server 106. The file pathname can correspond to the one or more audiovisual files for the multimedia content corresponding to the entity. The query parameter can include an attribute-value pair. The query parameter can be dynamically generated by the first digital assistant server 106, and may vary per the client device 104, the display device 108, or the search coordinator component 132.

Based on the entity from the query request, the first digital assistant server 106 can identify the reference address 148 corresponding to the entity. The first digital assistant server 106 can traverse through the content data repository 162. For each entity metadata 144, the first digital assistant server 106 can compare the entity with the entity metadata 144. For example, the first digital assistant server 106 can compare the entity "Bat Movie" to any of the entries for the entity metadata 144, such as the title. The first digital assistant server 106 can determine whether the one or more entries of the entity metadata 144 match the entity from the query request. The first digital assistant server 106 can determine that there is no match between the entity and the entity metadata 144. Responsive to the determination that there is no match, the first digital assistant server 106 can continue traversing the content data repository 162. The first digital assistant server 106 can determine that there are no more entity metadata 144 to traverse. Responsive to the determination that there are no more entity metadata 144 to traverse, the first digital assistant server 106 can determine that the entity does not exist on the content data repository 162. The first digital assistant server 106 can transmit a null response. The null response can indicate that the first digital assistant server 106 does not have multimedia content corresponding to the entity.

Conversely, the first digital assistant server 106 can determine that there is a match between the entity and the entity metadata 144. Responsive to the determination of the match, the first digital assistant server 106 can determine that the entity exists on the content data repository 162. The first digital assistant server 106 can identify the reference address 148 corresponding to the entity metadata 144 matching the entity. The first digital assistant server 106 can generate a search response. The search response can indicate that the first digital assistant server 106 does have the multimedia content corresponding to the entity. The search response can include the reference address 148 corresponding to the multimedia content for the entity.

The first digital assistant server 106 can continue to traverse through the content data repository 162 to identify additional matches between the entity of the query request and the entity metadata 144. With additional matches, the first digital assistant server 106 can repeatedly identify the reference address 148 corresponding to the entity metadata 144 matching the entity and can include the reference address 148 into the search response. The first digital assistant server 106 can determine that there are no more entity metadata 144 to traverse. Responsive to the determination that there are no more entity metadata 144 to traverse, the first digital assistant server 106 can send the response to the client device 104, the display device 108, or the search coordinator component 132 that sent the query search.

The data processing system 102 can include, interface, or otherwise communicate with the content indexer component 134. The content indexer component 134 can access the data repository 140 of the data processing system 102 or the first digital assistant server 106 to identify the reference address 148 corresponding to the entity. The content indexer component 134 can access the data repository 140, prior to accessing the first digital assistant server 106 to identify the reference address 148. The content indexer component 134 can traverse through the data repository 140. In addition to the application identifiers 142, the data repository 140 can include the one or more entity metadata 144 and the one or more ranking policies 146. The entity metadata 144 and the ranking policies 146 on the data repository 140 may be maintained separately and independently from the entity metadata 144 and the ranking policies 146 on the content data repository 162. The entity metadata 144 and the ranking policies 146 on the data repository 140 may be from previous search responses from the multimedia content providers. The content indexer component 134 can maintain a timer to keep track of a time elapsed for each entity metadata 144 and the associated reference address 148 in storage at the data repository 140.

The content indexer component 134 can traverse through the content data repository 140. For each entity metadata 144, the content indexer component 134 can compare the entity with the entity metadata 144. For example, the content indexer component 134 can compare the entity "Bat Movie" to any of the entries for the entity metadata 144, such as the title. The content indexer component 134 can determine whether the one or more entries of the entity metadata 144 match the entity from the query request. The content indexer component 134 can determine that there is no match between the entity and the entity metadata 144. Responsive to the determination that there is no match, the content indexer component 134 can continue traversing the content data repository 140. The content indexer component 134 can determine that there are no more entity metadata 144 to traverse. Responsive to the determination that there are no more entity metadata 144 to traverse, the content indexer component 134 can determine that the entity does not exist on the content data repository 140. In response to the determination that the entity does not exist on the content data repository 140, the content indexer component 134 can call the search coordinator component 132 to send the query request to the first digital assistant server 106 to retrieve the reference address 148.

Conversely, the content indexer component 134 can determine that there is a match between the entity and the entity metadata 144. Responsive to the determination of the match, the content indexer component 134 can determine that the entity exists on the content data repository 140. The content indexer component 134 can identify the reference address 148 corresponding to the entity metadata 144 matching the entity. The content indexer component 134 can store the reference address 148 corresponding to the entity.

The content indexer component 134 can identify the time elapsed for the identified reference address 148. The content indexer component 134 can compare the time elapsed to a pre-set expiration time. The pre-set expiration time can range from 1 hour to 1 month, as the first digital assistant server 106 may periodically update or change the catalogue of available multimedia content. The pre-set expiration time can correspond to an amount of time that the reference address 148 is valid for the entity at the first digital assistant server 106. The content indexer component 134 can determine that the time elapsed is less than the pre-set expiration time. Responsive to the determination that the time elapsed is less than the pre-set expiration time, the content indexer component 134 can store the reference address 148 corresponding to the entity. The content indexer component 134 can terminate accessing of the first digital assistant server 106 to search for the reference address corresponding to the entity.

On the other hand, the content indexer component 134 can determine that the time elapsed is greater than or equal to the pre-set expiration time. Responsive to the determination that the time elapsed is greater than or equal to the pre-set expiration time, the content indexer component 134 can replace the reference address 148 from the data repository 140. To update the data repository 140, the content indexer component 134 can call the search coordinator component 132 to send the query request to the first digital assistant server 106 to retrieve the reference address 148. The content indexer component 134 can receive the search response from the first digital assistant server 106. The search response can include a new reference address 148 for the entity. Responsive to the receipt of the reference address 148 from the first digital assistant server 106, the content indexer component 134 can save the reference address 148 onto the data repository 140 and can associate the newly saved reference address 148 with the entity metadata 144 matching the entity. The content indexer component 134 can receive the null response from the first digital assistant server 106. Responsive to the receipt of the null response, the content indexer component 134 can remove the reference address 148 from the data repository 140.

The content indexer component 134 can continue to traverse through the content data repository 140 to identify additional matches between the entity of the query request and the entity metadata 144. With additional matches, the content indexer component 134 can repeatedly identify the reference address 148 corresponding to the entity metadata 144 matching the entity and can include the reference address 148 into the search response. The content indexer component 134 can determine that there are no more entity metadata 144 to traverse. Responsive to the determination that there are no more entity metadata 144 to traverse, the content indexer component 134 can terminate the search for additional ranking policies 146 at the data repository 140. Subsequent to the traversal, the content indexer component 134 can call the search coordinator component 132 to send the query request to the first digital assistant server 106 to retrieve the reference address 148. The calling of the search coordinator component 132 may be irrespective of the comparison of the time elapsed with the pre-set expiration time described above.

Subsequent to calling the search coordinator component 132 to send the query request, the content indexer component 134 can receive the search response from the first digital assistant server 106. Receipt of the search response from the first digital assistant server 106 can indicate that the first digital assistant server 106 has access to the entity. The search response can include the reference address 148 corresponding to the entity. The content indexer component 134 can parse the search response to identify the reference address 148. Responsive to the identification of the match between the entity and the entity metadata 144 on the data repository 140, the content indexer component 134 can compare the reference address 148 from the data repository 140 with the reference address 148 from the first digital assistant server 106. The content indexer component 134 can determine that the reference address 148 from the data repository 140 differs from the reference address 148 from the first digital assistant server 106. The difference in ranking policies 146 may signify that the first digital assistant server 106 has updated the reference address 148 for the entity. Responsive to the determination that the ranking policies 146 differ, the content indexer component 134 can replace the reference address 148 stored at the data repository 140 with the reference address 148 from the first digital assistant server 106. The content indexer component 134 can determine that the reference address 148 from the data repository 140 is identical to the reference address 148 from the first digital assistant server 106. Responsive to the determination that the ranking policies 146 are identical, the content indexer component 134 can proceed to call the response handler component 138 to send a query result to the client device 104 or the display device 108, as described below.

The content indexer component 134 can receive a null response from the first digital assistant server 106. Receipt of the null response from the first digital assistant server 106 can indicate that the first digital assistant server 106 no longer has the entity. For example, the first digital assistant server 106 may have updated the catalogue of available multimedia content to exclude the entity. Responsive to the receipt of the null response and to the identification of the match between the entity and the entity metadata 144 on the data repository 140, the content indexer component 134 can remove the reference address 148 from the data repository 140. The content indexer component 134 can proceed to call the response handler component 138 to send a query result to the client device 104 or the display device 108, as described below. In some cases, the content indexer component 134 may receive no responses from the first digital assistant server 106 within a predetermined amount of time subsequent to transmission of the query response, for example, due to issues with the network 110 or an outage at the first digital assistant server 106. In such instances, the content indexer component 134 can maintain the ranking policies 146 at the data repository 140.

The data processing system 102 can include, interface, or otherwise communicate with a ranking engine component 136. The ranking engine component 136 can use one or more ranking policies 146 stored in data repository 140. The ranking engine component 136 can use a ranking decision function, such as the ranking decision functions or blocks depicted in FIGS. 2 and 3. The ranking decision function can be based on confidence scores, latency, time to completion, flags, priorities, preconfigured preferences, protocols, or other factors. For example, a second digital assistant 120 can be prioritized over the first digital assistant.

The ranking engine component 136 can process or parse the query from the client device 104 or display device 108 to identify or generate one or more signals for the query. The ranking engine component 136 can select a decision function from a plurality of decision functions stored in data repository 140. The decision functions can be referred to as or stored as policies 146. The decision functions (or policies 146) can vary based on the signals for the query. For example, a query for a media content can generate a signal that indicates to select the first digital assistant for results. A query for a search results from a database accessible to the data processing system 102 can generate a signal to prioritize the results from the second digital assistant.

Ranking decision functions can take into account confidence scores. For example, the first digital assistant or second digital assistant can return a confidence score along with the results. For example, if the second digital assistant returns the results first and provides a high confidence score (e.g., greater than 0.8 out of 1), then the data processing system 102 may not wait for any results to come from the first digital assistant, and proceed to transmit the results from the second digital assistant—thereby overriding the first digital assistant.

The data processing system 102 can include, interface, or otherwise communicate with the response handler component 138. Responsive to identification of the reference address 148 corresponding to the entity in the request, the response handler component 138 can transmit or provide the reference address 148 to the client device 104 or the display device 108. The response handler component 138 can generate instructions for rendering a content selection interface at the client device 104 or the display device 108. The content selection interface can include one or more selection elements and a placeholder element (collectively sometimes referred to as a "display card"). The one or more selection elements can correspond to a reference address 148 for the entity included in the request of the client device 104 or the display device 108. The search performed by the multimedia content applications 160 may not have completed, prior to the response handler component 138 sending the reference address 148 to the client device 104 or the display device 108. Consequently, the content selection interface can initially exclude the results from the search performed by the multimedia content applications 160 executing on the client device 104 or the display device 108. The response handler component 138 can provide the instructions for rendering the content selection interface, along with the reference address 148, to the client device 104 or the display device 108.

Subsequent to presentation of the content selection interface at the client device 104 or the display device 108, an interaction with the placeholder element can cause the client device 104 or the display device 108 to determine whether the search performed by the multimedia content applications 160 is completed. The client device 104 or the display device 108 can determine that the search performed by the multimedia content applications 160 is completed. Responsive to the determination that the search is completed, the client device 104 or the display device 108 can modify the content selection interaction to include additional selection elements. Each additional selection element can correspond to the reference address 148 found during the search performed by the multimedia content applications 160 executing on the client device 104 or the display device 108. Interaction with the selection elements of the content selection element can cause the client device 104 or the display device 108 to launch the multimedia content application 160 (or another application running on the client device 104 or the display device 108) to play the one or more audiovisual files corresponding to the reference address 148 of the associated selection element.

On the other hand, the client device 104 or the display device 108 can determine that the search performed by the multimedia content applications 160 is not yet completed. Responsive to the determination that the search is not yet completed, the client device 104 or the display device 108 can wait for a predetermined amount of time. During the predetermined amount of time, the client device 104 or the display device 108 can determine that the search performed by the multimedia content applications 160 is completed. Responsive to the determination that the search is completed, the client device 104 or the display device 108 can modify the content selection interaction to include additional selection elements. The client device 104 or the display device 108 can determine that the predetermined amount of time has elapsed and that the search is not yet completed. Responsive to the determination that that the predetermined amount of time has elapsed and that the search is not yet completed, the client device 104 or the display device 108 can modify the content selection interface to remove the placeholder element.

Figure 2:
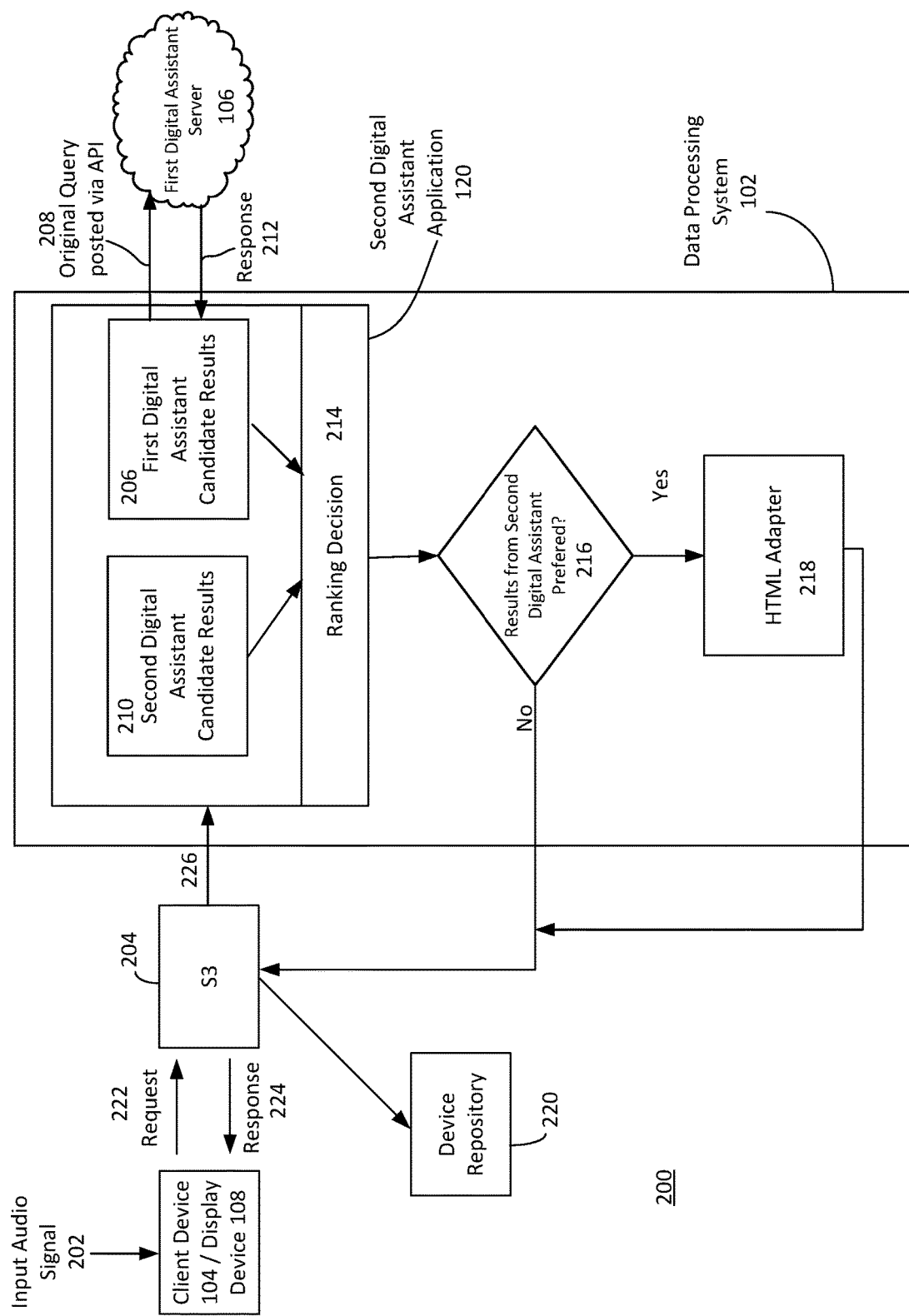
FIG. 2 illustrates an example operation of a system to coordinate overlapping processing of audio queries.

FIG. 2 illustrates an example operation of a system to coordinate overlapping processing of audio queries. The system 200 can include one or more component or functionality depicted in FIG. 1 or FIG. 5. The system 200 can include data processing system 102. The system 200 can include, interface with or otherwise communicate or utilize a first digital assistant server 106. The system 200 can include, interface with or otherwise communicate or utilize a second digital assistant server 120. The first digital assistant server 106 (which can be referred to as a first digital assistant, first digital assistant component, or first digital assistant application) can execute independently of the second digital assistant application 120 (which can be referred to as a second digital assistant, second digital assistant component, or second digital assistant application). One of the first digital assistant or second digital assistant can be referred to as a local digital assistant, while the other of the first digital assistant or the second digital assistant can be referred as a remote digital assistant. For example, the first digital assistant server 106 can be referred to as a remote digital assistant, and the second digital assistant application 120 can be referred to as a local digital assistant. In some cases, the first digital assistant server 106 can be referred to as a local digital assistant, and the second digital assistant application 120 can be referred to as a remote digital assistant.

At ACT 202, client device 104 (which can include the display device 108, be integrated with the display device 108, or otherwise communicatively coupled with the display device 108) can receive an input audio signal. The client device 104 can be referred to as a computing device or client computing device. The client device 104 can receive the audio signal from a user. The audio signal can include voice input provided by a user of the client device 104. The voice input can include a request, query, command, instruction, or response. A microphone (e.g., sensor 152 or transducer 154) of the client device 104 can detect or receive the audio input.

At ACT 222, the client device 104 can transmit or provide the audio input, or data corresponding to the audio input, to a server. The client device 104 can transmit the audio input, or data corresponding to the audio input, to a streaming speech server ("S3") 204 or a data processing system 102. The client device 104 can convert the audio input received at ACT 202 into a format configured for transmission to a server. The client device 104, for example, can pre-process the audio input and convert the audio input into a digital format configured for transmission over a data network. The client device 104 can transmit the audio input, or data corresponding to the audio input, responsive to identifying a request in the audio input. A request can include a keyword, hotword, wakeup word, token or other indication in the audio input that indicates to the client device 104 that the user has a request for content or an action to be performed by the client device 104 or one or more servers. The client device 104 can transmit the audio input, or data corresponding to the audio input responsive to authorization or authentication.

The client device 104 can transmit the input audio signal as a request to the streaming speech server 204. The request can include a request to convert audio, speech or voice to text or some other format that facilitates downstream transmissions or processing of the audio input. The S3 server 204 can transcribe voice to text. At ACT 224, the S3 server 204 can send the results of the transcription back to the client device 104. In some cases, the S3 server 204 can transmit the transcribed results to the data processing system 102 for further processing. In some cases, the S3 server can transmit the transcribed results to a device repository 220 for storage.

At ACT 226, the S3 server 204 can transmit transcribed results to the data processing system 102. The transcribed results can include data packets having a query that corresponds to the input audio signal received at ACT 202. The S3 server 204 can forward the text query to data processing system 102. In some cases, the client device 204 can convert the audio input to data packets and transmit the data packets to the data processing system 102 without transmitting the audio input to the S3 server 204.

The data processing system 102 can receive, via an interface, the one or more data packets corresponding to the audio signal detected by the client device 104. The data processing system 102 can receive the one or more data packets from the client device 104 or the S3 server 204. The one or more data packets can include a text query, or the data processing system 102 can process the one or more data packets to identify a query. For example, the data processing system 102 can generate a query based on the received data packets corresponding the audio signal.

The data processing system 102 can transmit the query to one or more digital assistants for processing. The data processing system 102 can provide the query to one or more digital assistants for processing. The data processing system 102 can process the query using one or more digital assistants executed or managed by the data processing system 102. The data processing system 102 can provide the query to one or more digital assistants external from the data processing system 102. A digital assistant can be external from the data processing system 102 if it is geographically remote from the data processing system 102, or administered or managed by a different entity than the data processing system 102. The digital assistant can be referred to as external from the data processing system 102 if it is a different type of digital assistant.

The data processing system 102 can transmit, provide, or otherwise convey or communicate the query to multiple digital assistant components for processing. One or more of the multiple digital assistants can process the query and generate a response to the query. The data processing system 102 can include an internal digital assistant, such as a second digital assistant application 120. The second digital assistant application 120 can process the query to generate a response to the query. The data processing system 102 (or interface 122) can transmit the query to the second digital assistant application 120 for processing. The data processing system 102 (or interface 122) can transmit the query to the first digital assistant server 106 external to the data processing system 102 for processing. The data processing system 102 (e.g., via interface 122 or the second digital assistant application 120) can simultaneously transmit the query to multiple digital assistants for processing at the same time or in an overlapping manner. For example, the second digital assistant application 120 can receive the query and transmit the query to the first digital assistant server 106 to generate a response to the query. The second digital assistant application 120 can transmit the query to the first digital assistant server 106 prior to the second digital assistant application 120 processing the query or generating a response to the query, thereby reducing latency or delay caused by the second digital assistant application 120. In some cases, to further reduce latency or delay, the interface 122 can simultaneously transmit the query to the second digital assistant application 120 and the first digital assistant server 106 for simultaneous or overlapping processing.

The data processing system 102 (e.g., via interface 122) can transmit the query to the first digital assistant server 106 before the second digital assistant application 120 of the data processing system 102. The data processing system 102 can transmit the query to the first digital assistant server 106 after the query is transmitted to the second digital assistant application 120. The data processing system 102 can transmit the query to the first digital assistant server 106 after the second digital assistant application 120 receives the query. The data processing system 102 can utilize an application programming interface (API) to transmit or post the query, or original query received by the data processing system 102 from the client device 104, to the first digital assistant server 106. In some cases, the data processing system 102 can provide, transmit, relay or forward the original query received from the client device 104 to the first digital assistant server 106. In some cases, the data processing system 102 can process or modify the original query prior to transmission to the first digital assistant server 106.

The data processing system 102 can process or parse the text query using the second digital assistant and generate second digital assistant candidate results 204. The text query can be passed at 208 to the first digital assistant server 106, which can be executing in a cloud server system. The first digital assistant server 106 can be separate from the data processing system 102 that executes the second digital assistant. The data processing system can transmit the query to each of the plurality of digital assistants via an independent branch to cause the plurality of digital assistants to process the query in an overlapping manner. The independent branch can refer to a logical branch in a logic flow, or a separate processing thread in which the separate digital assistants are not in communication with one another while they are separately processing the query to generate the response. The separate digital assistants can separately process the query to generate the results in an overlapping manner. The first digital assistant candidate results 206 can be provided to the data processing system 102 in response 212. The first digital assistant server 106 can be established by a different administrator that established the second digital assistant application 120. For example, different companies, entities or manufacturers may have been responsible for designing and constructing the first digital assistant server 106 as compared to the second digital assistant application 120. The first digital assistant server 106 and the second digital assistant application 120 can execute independently of one another to generate a response or result for the query.

The first and second digital assistants can have access to different types of information or data. The first digital assistant server 106 can be authorized to access a database or data source that the second digital application 120 may not be authorized to access or prohibited from access. For example, the first digital assistant server 106 can have access to a multimedia repository storing movies or songs. Access to this multimedia repository can include authorization via credentials or a subscription. The first digital assistant 106 may have access to the authentication information via subscription information associated with the client device 104 or user profile of the client device 104, however these credentials may not be transferred or usable the second digital assistant application 120.

The data processing system 102 can receive results to the query. The data processing system 102 can receive candidate results to the query from one or more digital assistants. The data processing system 102 can receive second digital assistant candidate results 210. At ACT 212, the data processing system 102 can receive first digital assistant candidate results 206. The first digital assistant candidate results 206 and the second digital assistant candidate results 210 can be in a similar format as one another, or different formats. The first digital assistant candidate results 206 and the second digital assistant candidate results 210 can be from different sources and generated using different techniques, functions, parameters, selection criteria, or processes.

The results from the first or second digital assistant components can include content items, references, links, images, text, video, audio, or other type of results that are responsive to, or based on, the query from the input audio signal received by the client device 104. The results can include data from various sources. The results can include streaming data. The results can include a reference or link to streaming content, such as streaming audio or video. The results can include suggestions that are responsive to the query. The results can include a deep link to content. The results can include authentication or credentialing information that is configured to authorize the client device 104 to access the content contained or identified in the results.

At 214, the data processing system 102 can perform a ranking decision to select candidate results 204 or 206. The second digital assistant application 120 can perform the ranking decision. The ranking engine component 136 of the data processing system 102 or the second digital assistant application 120 can performing the ranking decision. For example, the ranking engine component 136 can receive the candidate results or an indication that the candidate results from the multiple digital assistant components are available. The ranking engine component 136 can wait to perform the ranking decision until the ranking engine component 136 has received an indication that results have been received from all of the digital assistant components to which the data processing system 102 transmitted the query.

The data processing system 102 (e.g., via ranking engine component 136) can determine, based on a ranking decision function, to select the response or results from one of the first digital assistant application server 106 (e.g., first digital assistant component) or the second digital assistant application 120 (e.g., second digital assistant component). The data processing system 102 can determine to select the second digital assistant candidate results 210, or the first digital assistant candidate results 206. The data processing system 102 can determine to select one of the results from one of the second digital assistant candidate results 210 or the first digital assistant candidate results 206. For example, the data processing system 102 can determine to select a response or result from the second digital assistant component instead of a response or result from the first digital assistant component.

The data processing system 102 can utilize various ranking decision functions or techniques in order to select a result or response, some examples of which are described in the following paragraphs. The data processing system 102 can select the ranking decision function or technique based on a signal associated with the input audio signal or query corresponding to the input audio signal. The data processing system 102 can select the digital assistant or response based on the signal associated with the input audio signal or query corresponding to the input audio signal. Signals can indicate whether the query is for a type of media, internet search query, news request, weather request, video request, movie request, music request, or other type of request. The data processing system 102 can select the response or result based on information associated with the digital assistant that provided the result, based on information associated with the result itself, based on information associated with the client device 104, based on information associated with a profile of a user associated with the client device 104, based on the type of result, based on the data source used to provide the result, based on the data source to which the result links or points, the data size of the results, or other factors.

The data processing system 102 can select the results or response based on pre-configured preferences. The pre-configured preferences can be stored or configured on the client device 104, the data processing system 102, or the first digital assistant server 106. For example, the second digital assistant application 120 can execute at least partially on the client device 104. The second digital assistant application 120 can include an interface located on the client device 104. The second digital assistant application 120 can be associated with an administrator, manufacturer or provided of the client device 104. The second digital assistant application 120 can be pre-configured to be the preferred digital assistant. Being the preferred digital assistant for the client device 104 can cause the data processing system 102 to prioritize selection of a results from the second digital assistant candidate results 210 instead of a result from the first digital assistant candidate results 206. The data processing system 102 can rank results from the second digital assistant 120 higher than results from the first digital assistant 106. The data processing system 102 can weight results from the second digital assistant application 120 more heavily than results from the first digital assistant server 106. By ranking, weighting, or otherwise prioritizing results from the second digital assistant application 120, the data processing system 102 may be more likely to select a result from the second digital assistant 120 as compared to a result from the first digital assistant server 106. Configuration information associated with the preference, ranking, weighting, or other prioritization can be stored in database 140 (e.g., policies 146 data structure) or stored on the client device 104, or other data storage device.

The data processing system 102 can select a result or response based on information about or associated with the response or result itself. For example, the data processing system 102 can determine, based on the ranking decision function, to select a response based on the response containing audio-only, video and audio, video-only, text only, image only, or other multimedia content. The data processing system 102 can select, for example, a first response based on an attribute or characteristic associated with the second response. For example, the data processing system 102 can select the first response, which may include video, responsive to the second response including only audio.

The data processing system 102 can select a result, response or digital assistant based on a data source for the result or digital assistant. For example, the data processing system 102 can determine, based on the ranking decision function, to select a second response from a second digital assistant component based on the second digital assistant component accessing data stored in memory of the client device 104. The data processing system 102 can make this determination to reduce network bandwidth use or latency or data storage as a result of the data being stored on the client device 104 that presents or renders the data.

The data processing system 102 can select a response or results based on information associated with how the result was selected. For example, the selection technique or process used to select a result can output a confidence score for the result. The confidence score can reflect, indicate or convey a level of confidence associated with whether the result is accurate, reliable, or responsive to the query. For example, a certain result can have a high confidence score (e.g., 0.7, 0.8, 0.9 or 1) associated with the result, while another result may have a low confidence score (e.g., 0.4, 0.3, 0.2 or less). The confidence score can indicate a likelihood of the result being a match or responsive to the query. The confidence score can indicate a likelihood that the user of the client device 104 will interact with the result or content item corresponding to the result. Thus, the data processing system 102 can select, for example, a response or result from the second digital assistant candidate results 210 based on a confidence score for the response from the second digital assistant component.

A result may have a low or high confidence score based on one or more factors. For example, a digital assistant component may have access to a finite or predetermined set of data or data sources. The digital assistant component can be limited in terms of results based on the limited access to the data source. The digital assistant component, therefore, may determine that the best matching result from the limited set of data sources may still be associated with a low confidence score.

At decision block 216, the data processing system 102 (or ranking engine component 136) can determine whether results from the second digital assistant are preferred. If the data processing system 102 determines, at decision block 216, that results from the second digital assistant are preferred, then the data processing system proceeds to HTML adapter 218. HTML adapter 218 can convert the results from the second digital assistant, which can be coded in HTML, into a format that is compatible with the S3 server 204. The HTML adapter 218 of the data processing system 102 can forward the converted results from the second digital assistant candidate results 210 to the S3 server.

If, however, the data processing system 102 determines, at decision block 216 that results from the second digital assistant are not preferred, then the data processing system 102 can proceed to S3 server 204 and provide the response 212 from the first digital assistant server 106.

The data processing system 102 (e.g., ranking engine component 136) can be configured with various logic, rules, heuristic techniques or other functionality to select a response. For example, the data processing system 102 can determine that the first digital assistant component is a preferred digital assistant. The data processing system 102 can determine that the first digital assistant is the preferred digital assistant based on the type of query, configuration information, profile information, pre-determined information, or other factors. The data processing system 102 can receive, from the first digital assistant that is set as the preferred digital assistant, a first response. This first response from the first digital assistant can be associated with a flag. The first digital assistant can assign, affix, provide, or otherwise indicate the flag for the first response. The flag can indicate that this first response is a fallback response. A fallback response can refer to a response that is an alternative response to be used in the instance that there is not another response. The fallback response can indicate to lower a priority, weight, or ranking of the first response when inputting the response into a selection process being performed by the ranking engine component 136. The first digital assistant or data processing system 102 can determine to flag the first response as a fallback response based on a confidence score associated with the first response, or other factor associated with the first response. For example, the first digital assistant component can determine that a quality associated with the data file associated with the first response is of low quality or has a quality that is below a threshold. Quality can refer to or include video quality, image quality, or audio quality. Quality can refer to or include data streaming rate. Quality can refer to delay in transmitting the data file, or establishing a connection with the data source. Quality can refer to the quality of the substance of the response, such as a rating or review associated with the result. Quality can refer to relevance of the result to the query or a profile associated with the client device 104. The first digital assistant component can determine that a confidence score associated with the first response is low or below a threshold.

Responsive to determining that the quality or confidence score associated with the result is low or below a threshold, the first digital assistant component can flag the response as a fallback response. That is, although the first digital assistant component (e.g., first digital assistant server 106) is configured to be the preferred digital assistant, the first digital assistant component can flag a response generated or provided by the first digital assistant component as a fallback response. The data processing system 102 (e.g., ranking engine component 136), upon receiving the result from the first digital assistant server 106 that is the preferred digital assistant, can override the first digital assistant component. For example, the data processing system 102 may be configured to select the response from the preferred digital assistant component. However, since the result from the preferred digital assistant component is flagged as a fallback response, the data processing system 102 can determine not to select the response from the first digital assistant component, thereby overriding the first digital assistant component. Instead, the data processing system 102 can select a response from the second digital assistant component 120, which may not be the preferred digital assistant component, to provide to the client device 104.

Upon overriding the first digital assistant component by selecting the response from the second digital assistant, even though the first digital assistant is the preferred digital assistant component, the data processing system 102 can, nevertheless, maintain the first digital assistant component as the preferred digital assistant. For example, the data processing system 102 can override the first digital assistant component for the response that is flagged as a fallback response, but not for other responses that are not flagged as fallback responses.

The data processing system 102 can provide the one or more selected results or the one or more results from the selected digital assistant to the client device 104. The data processing system 102 can provide the results to the client device 104 via another device or server. The data processing system 102 can pre-process or otherwise manipulate or modify the results before providing them to the client device 104. The data processing system 102 can provide the results to a device or server remote from the data processing system 102 for processing prior to the results being provided to the client device. For example, the data processing system 102 can provide the results to the S3 server 204. The S3 server 204 can convert the response received either from the HTML adapter 218 or the first digital assistant server 106 into audio, and provide the audio response to the client device 104 or display device 108 for rendering or presentation. The S3 server 204 can save the response in a device repository 220 for further processing or as a data log for further processing.

In some cases, the data processing system 102 can provide the selected response or result to the client device 104. The client device 104 can be configured to present the response via an output interface of the client device 104. The client device 104 can be configured to convert a result or response from one format to another format for presentation via an output interface of the client device 104. For example, the client device 104 may itself be configured with text-to-speech functionality in order to convert text or HTML content into audio output or visual output.

Figure 3:
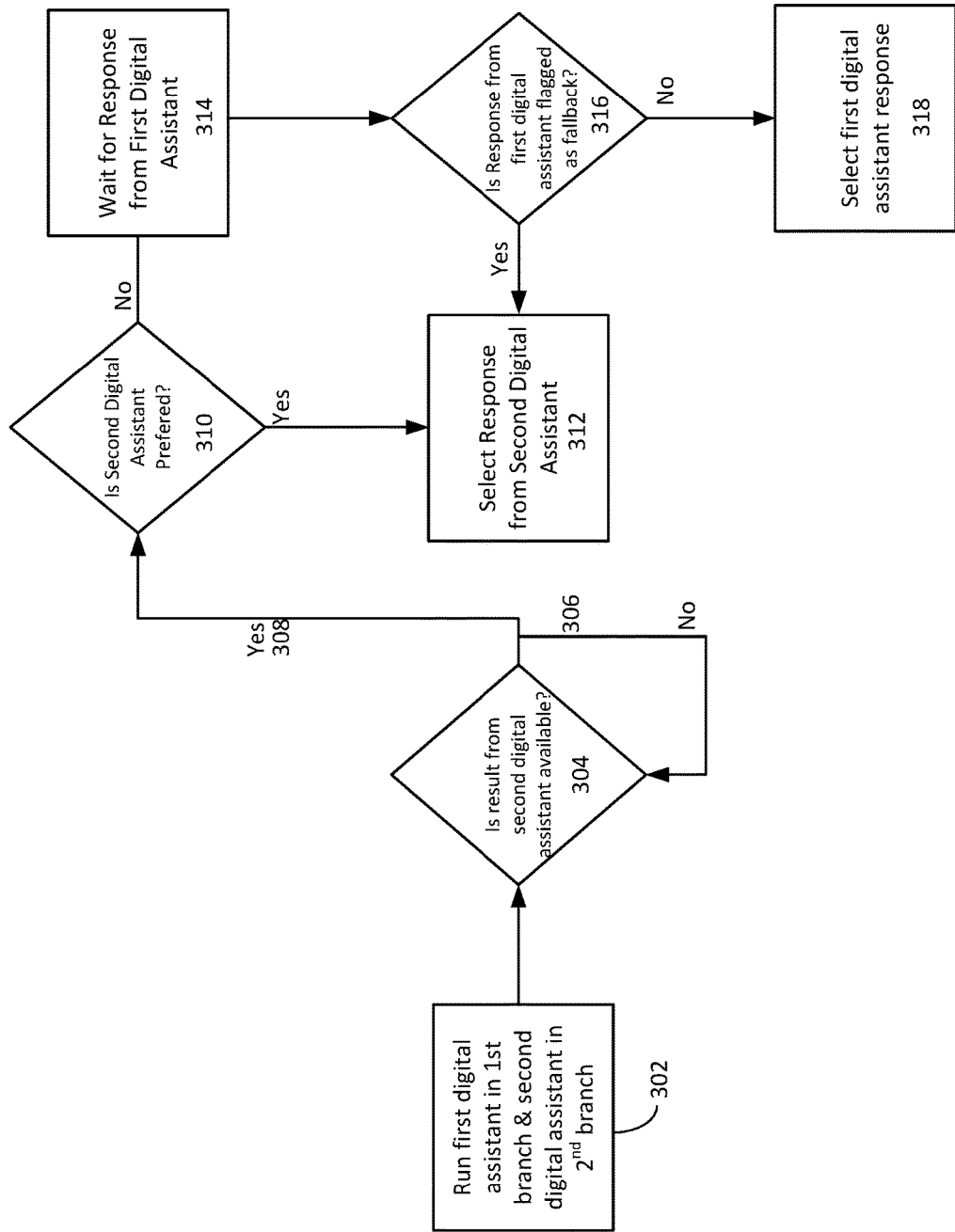
FIG. 3 illustrates a flow diagram to coordinate overlapping processing of audio queries using the example system illustrated in FIG. 1 or FIG. 2.

FIG. 3 illustrates a flow diagram to coordinate overlapping processing of audio queries using the example system illustrated in FIG. 1 or FIG. 2. The process 300 can be performed by a data processing system 102, first digital assistant server 106, client device 104, one or more processor or computing device 500. At 302, a data processing system can run the first digital assistant in a first branch and run the second digital assistant in a second branch. The two digital assistant can run in parallel or an overlapping manner. Overlapping processing can refer to both digital assistant running at the same time for at least a partial amount of time. Overlapping process can refer to running at least partially in parallel, or at least partially at the same time. One of the digital assistants may begin running first or stop running first. The processing on the separate digital assistant can occur concurrently (e.g., at the same time). The first digital assistant can run on a third party server. The second digital assistant can run on the data processing system. The first digital assistant can be administered by a third party different from the entity that administers the second digital assistant.

At 304, the data processing system can execute a decision block to determine if the result from the second digital assistant is available. If the result from the second digital assistant is not available, then act 306, the data processing system can return to decision block 304 and check again to see if the result is available. The data processing system can return to decision block 304 to repeatedly check if the result from the second digital assistant is available. In some cases, the data processing system can timeout if the result from the second digital assistant is not available for a predetermined amount of time (e.g., 10 seconds, 30 seconds, 60 seconds or more).

If the data processing system determines at block 304 that the results from the second digital assistant are available (ACT 308), the data processing system can proceed to decision block 310 to determine if the results from the second digital assistant are preferred. If the results from the second digital assistant are preferred, then the data processing system can proceed to block 312, where the data processing system can select the response from the second digital assistant.

If, however, the data processing system determines at block 310 that the results from the second digital assistant are not preferred, then the data processing system can proceed to block 314 and wait for the response from the first digital assistant. When the data processing system receives the results from the first digital assistant, the data processing system can proceed to decision block 316 at which the data processing system can determine whether the response from the first digital assistant is flagged as a fallback response. A fallback response can indicate that the response is only to be used as a fallback, or a last resort or a last measure. A response can be tagged or flagged as a fallback response if there is a low confidence score (e.g., less than a threshold such as 0.2, 0.3, 0.4 or less) that the response is accurate, reliable or correct.

If, at decision block 316, the data processing system determines that the response from the first digital assistant server is flagged as a fallback response, the data processing system can proceed to select the response from the second digital assistant at block 312. For example, if the response from the first digital server is flagged as a fallback, the data processing system can override the first digital assistant response even though the first digital assistant is the preferred digital assistant, and proceed to use the second digital assistant.

If, however, the first digital assistant response is not flagged as a fallback, as determined by the data processing system at decision block 316, the data processing system 102 can proceed to block 318 and select the first digital assistant response.

In some cases, at block 304, the data processing system can determine that results from the second digital assistant component are available or ready before results from the first digital assistant component. The data processing system can determine, at block 310, that the second digital assistant component is not a preferred digital assistant component. The data processing system can make this determination based on configuration information, instruction, indication or other data. The data processing system determine that the first digital assistant is the preferred digital assistant. For example, the configuration, instruction, indication or other data file can indicate which of the multiple digital assistants is the preferred digital assistant. By determining that the first digital assistant is the preferred digital assistant at block 310, the data processing system can determine that the second digital assistant is not the preferred digital assistant at block 310.

The data processing system can take one or more actions responsive to determining that the second digital assistant is not the preferred digital assistant or responsive to determining that the first digital assistant is the preferred digital assistant. For example, at block 314, the data processing system can wait, responsive to the determination that the second digital assistant component is not a preferred digital assistant and the first digital assistant is the preferred digital assistant, for the first response from the first digital assistant component. Thus, although the data processing system received a response from the second digital assistant before receiving any response from the first digital assistant, the data processing system can wait for the first response from the first digital assistant because the first digital assistant is the preferred digital assistant.

The data processing system can receive a response from the first digital assistant. The data processing system can receive the response from the first digital assistant after waiting for the response after first receiving the response from the first digital assistant. The data processing system can determine, upon receipt of the first response from the first digital assistant component, that the first response is flagged as a fallback response at block 316. For example, the first digital assistant, although being configured as the preferred digital assistant, can assign the response generated by the first digital assistant as a fallback response. At block 312, the data processing system can select the second response based on the determination that the second digital assistant component is not the preferred digital assistant and the first response is flagged as the fallback response. While the data processing system may prioritize responses from the first digital assistant, and may have waited for the response from the first digital assistant even though the data processing system had already received a response from the second digital assistant, the data processing system may ultimately decide to select the response from the second digital assistant because the response from the first digital assistant was flagged as a fallback response. The response from the second digital assistant may not have been flagged as a fallback. If responses from both the first and digital assistants were flagged as fallback responses, then the data processing system can select the response from the preferred digital assistant, such as the first digital assistant in this example. Thus, the data processing system can rank the response from the preferred digital assistant higher and select the response from the preferred digital assistant, unless the response from the preferred digital provider is flagged as a fallback response and the response from the not preferred digital assistant is not flagged as a fallback.

Figure 4:
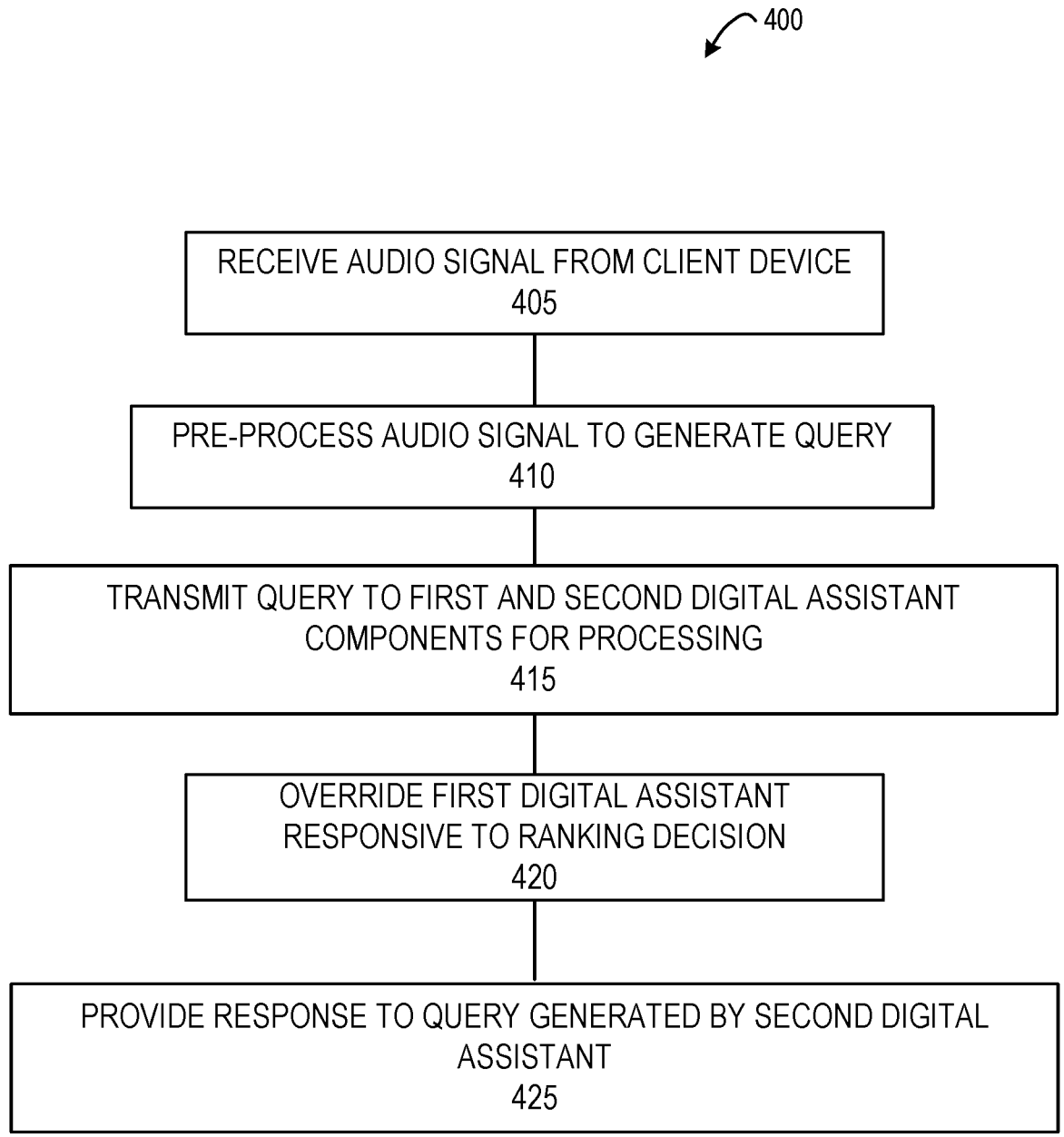
FIG. 4 illustrates a method to coordinate overlapping processing of audio queries using the example system illustrated in FIG. 1 or FIG. 2.

FIG. 4 illustrates a method to coordinate parallel processing of audio queries across multiple devices using the example system illustrated in FIG. 1 or FIG. 3. For example, the method 400 can be performed by data processing system 102. At 405, the data processing system can receive an audio signal from the client device. The client device can detect the audio signal using a sensor, such as a microphone or transducer. The audio signal can include voice or speech from a user of the client device. The audio signal can include a wakeup word, keyword, hotword, or trigger word to alert the client device to take action responsive to at least a portion of the audio signal.

At ACT 410, the audio signal can be converted to text to generate a query. For example, the client device itself can convert the detected audio signal to speech, or the client device can transmit the audio signal to a streaming speech server to convert the audio to text. The client device can pre-process or convert the audio signal to another format to facilitate data transmissions over a network. For example, the client device can convert the analog audio input signal to a digital audio signal that facilitates transmitting the audio signal as a payload in data packets over a network. The data processing system or streaming speech server can, upon receiving the data packets, convert the audio signal to text. The data processing system can identify a query in the text corresponding to the audio signal. The query can include, for example, a request for content. The query can include a request for data or information. The query can include a request for the data processing system or client device or other device to perform an action, such as a digital or electronic action.

At ACT 415, the data processing system can transmit the query to a first digital assistant server for processing. The data processing system can transmit the query to a second digital assistant server for processing. The data processing system can transmit the query to multiple digital assistants via separate branches. Branches can refer to processing threads. The data processing system can simultaneously transmit the queries to multiple digital assistants for processing.

At ACT 420, the data processing system can use ranking decision logic to override the first digital assistant's response and select the second digital assistant's response. The data processing system can select a ranking decision logic based on a signal in the query. Signals can refer to or indicate types of queries, such as movie queries, news queries, music queries, audio book queries, weather queries, or television show queries, for example. The data processing system can identify a signal indicating a type of query, and then select a corresponding ranking decision logic to select a preferred digital assistant. For example, if the query is a movie query, then the data processing system can set the first digital assistant as the preferred digital assistant. However, if the signal indicates the query is a search query, then the data processing system can set the second digital assistant as the preferred digital assistant, for example.

The data processing system can select the ranking decision function from a pool of multiple ranking decision function. The data processing system can select the ranking decision function based on the signal of the query. For example, the data processing system can select a first ranking decision function for a movie query, a second ranking decision function for a music query, or a third ranking decision function for a news query. For example, the first ranking decision function can assign the first digital assistant as the preferred digital assistant, and set a first threshold for a confidence score for responses. The second ranking decision can assign the second digital assistant as the preferred digital assistant, and set a second threshold confidence score for responses. The first and second thresholds can be set or tuned based on factors associated with responses to the respective queries. For example, there may be a lower confidence score threshold for weather queries, but a higher confidence score threshold for navigation related queries or movie related queries.

For example, a first digital assistant can be configured to process and respond to audio queries that are related to media domain queries such as "play Movie_A on Streaming_Service_A", while a second digital assistant component can be configured to process and respond to search domain queries such as "when is my next appointment". If the signal of the query is ambiguous or fall into multiple categories, then the data processing system can rank the responses from the multiple digital assistant components and select a response from one of the digital assistant component. For example, the data processing system can score or rank the responses or queries based on a confidence level, quality score, or other factors.

Thus, the data processing system can use the ranking decision logic or function to select one of the digital assistants from which to select the response. At ACT 425, the data processing system can provide the selected response from the selected digital assistant to the client device for presentations. For example, the data processing system can provide the response to the query generated by the second digital assistant to the client device for presentation.

Figure 5:
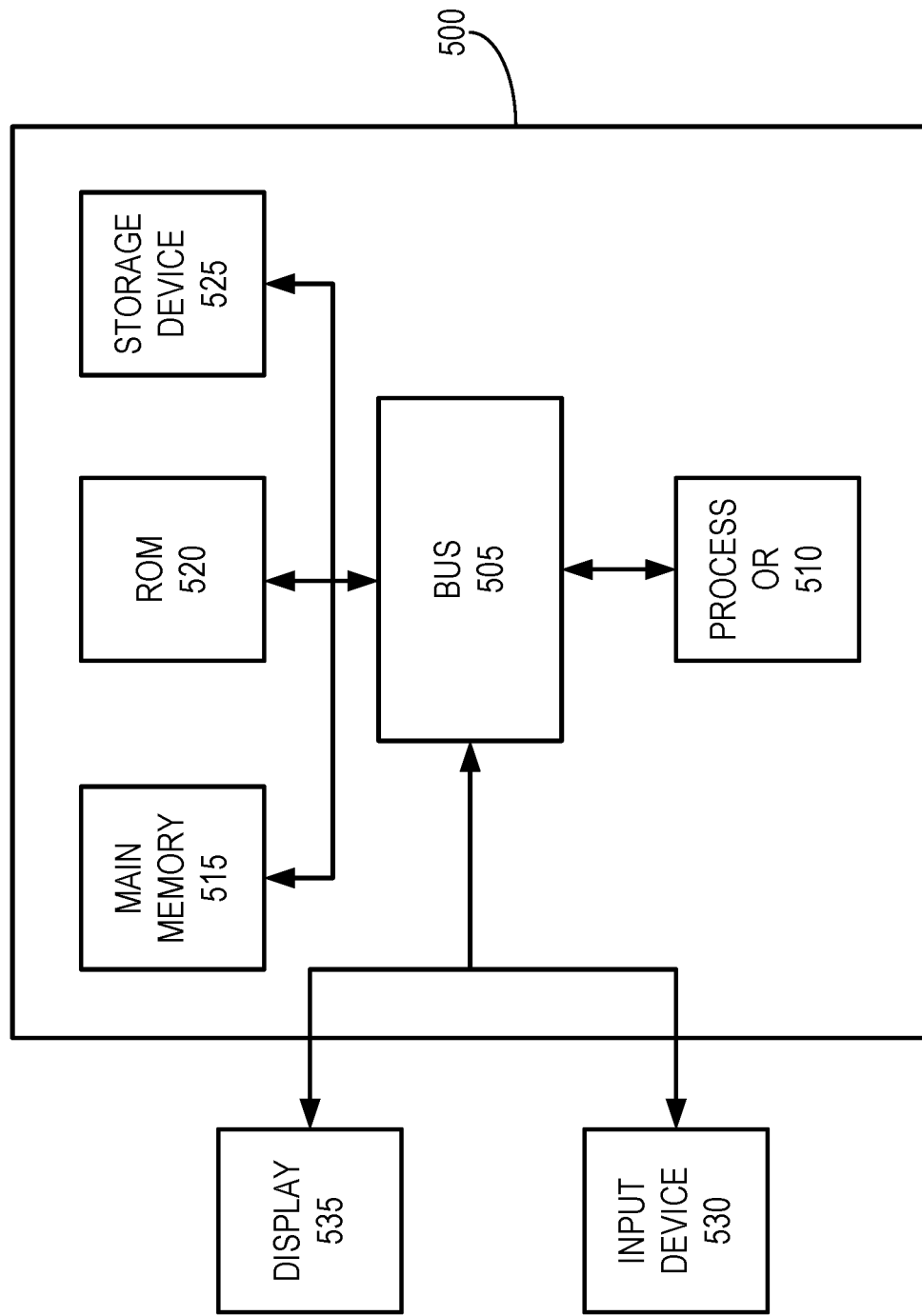
FIG. 5 is a block diagram illustrating a general architecture for a computer system that can be employed to implement elements of the systems and methods described and illustrated herein, including, for example, the systems depicted in FIGS. 1 and 2, the flow depicted in FIG. 3, or the method depicted in FIG. 4.

FIG. 5 is a block diagram of an example computer system 500. The computer system or computing device 500 can include or be used to implement the system 100 or its components such as the data processing system 102, the client device 104, the first digital assistant server 106, and the display device 108. The computing system 500 includes a bus 505 or other communication component for communicating information and a processor 510 or processing circuit coupled to the bus 505 for processing information. The computing system 500 can include one or more processors 510 or processing circuits coupled to the bus for processing information. The computing system 500 includes main memory 515, such as a random access memory (RAM) or other dynamic storage device, coupled to the bus 505 for storing information and instructions to be executed by the processor 510. The main memory 515 can be or include the data repository 140. The main memory 515 can also be used for storing position information, temporary variables, or other intermediate information during execution of instructions by the processor 510. The computing system 500 may further include a read-only memory (ROM) 520 or other static storage device coupled to the bus 505 for storing static information and instructions for the processor 510. A storage device 525, such as a solid state device, magnetic disk or optical disk, can be coupled to the bus 505 to persistently store information and instructions. The storage device 525 can include or be part of the data repository 140.

The computing system 500 may be coupled via the bus 505 to a display 535, such as a liquid crystal display or active matrix display, for displaying information to a user. An input device 530, such as a keyboard including alphanumeric and other keys, may be coupled to the bus 505 for communicating information and command selections to the processor 510. The input device 530 can include a touch screen display 535. The input device 530 can include a cursor control, such as a mouse, a trackball, or cursor direction keys, for communicating direction information and command selections to the processor 510 and for controlling cursor movement on the display 535. The display 535 can be part of the data processing system 102, the client devices 104, the display devices 108, or other component of FIG. 1, for example.

The processes, systems and methods described herein can be implemented by the computing system 500 in response to the processor 510 executing an arrangement of instructions contained in main memory 515. Such instructions can be read into main memory 515 from another computer-readable medium, such as the storage device 525. Execution of the arrangement of instructions contained in main memory 515 causes the computing system 500 to perform the illustrative processes described herein. One or more processors in a multi-processing arrangement may be employed to execute the instructions contained in main memory 515. Hard-wired circuitry can be used in place of or in combination with software instructions together with the systems and methods described herein. Systems and methods described herein are not limited to any specific combination of hardware circuitry and software.

Although an example computing system has been described in FIG. 5, the subject matter including the operations described in this specification can be implemented in other types of digital electronic circuitry or in computer software, firmware, or hardware, including the structures disclosed in this specification and their structural equivalents, or in combinations of one or more of them.

For situations in which the systems discussed herein collect personal information about users, or may make use of personal information, the users may be provided with an opportunity to control whether programs or features that may collect personal information (e.g., information about a user's social network, social actions, or activities; a user's preferences; or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The subject matter and the operations described in this specification can be implemented in digital electronic circuitry or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage multimedia for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial-access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or multimedia (e.g., multiple CDs, disks, or other storage devices). The operations described in this specification can be implemented as operations performed by a data processing apparatus on data stored on one or more computer-readable storage devices or received from other sources.

The terms "data processing system," "computing device," "component," or "data processing apparatus" encompass various apparatuses, devices, and machines for processing data, including, by way of example, a programmable processor, a computer, a system on a chip, or multiple ones, or combinations of the foregoing. The apparatus can include special-purpose logic circuitry, e.g., an FPGA (field-programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The components of system 100 can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 102, the client device 104, the first digital assistant server 106, and the display device 108) to perform actions by operating on input data and generating output. The processes and logic flows can also be performed by, and apparatuses can also be implemented as, special purpose logic circuitry, e.g., an FPGA (field-programmable gate array) or an ASIC (application-specific integrated circuit). Devices suitable for storing computer program instructions and data include all forms of non-volatile memory, multimedia and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 100 or system 500 can include clients and servers. A client and server are generally remote from each other and typically interact through a communication network (e.g., the network 110). The relationship of client and server arises by virtue of computer programs running on the respective computers and having a client-server relationship to each other. In some implementations, a server transmits data (e.g., data packets representing a content item) to a client device (e.g., for purposes of displaying data to and receiving user input from a user interacting with the client device). Data generated at the client device (e.g., a result of the user interaction) can be received from the client device at the server (e.g., received by the data processing system 102 from the client devices 104 or the display device 108).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the NLP component 124 and the direct action API 126 can be a single component, app, or program, or a logic device having one or more processing circuits, or part of one or more servers of the data processing system 102.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations, elements, or acts of the systems and methods herein referred to in the singular may also embrace implementations including a plurality of these elements, and any references in plural to any implementation, element, or act herein may also embrace implementations including only a single element. References in the singular or plural form are not intended to limit the presently disclosed systems or methods, their components, acts, or elements to single or plural configurations. References to any act or element being based on any information, act, or element may include implementations where the act or element is based at least in part on any information, act, or element.

Any implementation disclosed herein may be combined with any other implementation or embodiment, and references to "an implementation," "some implementations," "one implementation," or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Where technical features in the drawings, detailed description, or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system to coordinate overlapping processing of audio queries, comprising:
  a data processing system comprising at least one processor and memory to:
    receive, via an interface, one or more data packets corresponding to an audio signal detected by a sensor of a computing device;
    generate a query based on the audio signal received via the one or more data packets;
    transmit the query to a plurality of digital assistant components, including transmitting the query, using an application programming interface, to a first digital assistant component that executes on a remote server and that is administered by a first entity, and transmitting the query to a second digital assistant component that executes on the computing device and that is administered by a second entity, wherein the first entity is different from the second entity;
    receive a first response to the query from the first digital assistant component of the plurality of digital assistant components;
    receive a second response to the query from the second digital assistant component of the plurality of digital assistant components, wherein the first digital assistant component is authorized to access a database the second digital assistant component is prohibited from accessing, and wherein the first digital assistant component and the second digital assistant component are configured to process the query at least partially in parallel;
    determine, based on a ranking decision function and a domain to which the query belongs, to select the second response from the second digital assistant component instead of the first response from the first digital assistant component, wherein determining to select the second response comprises:
      determining the first digital assistant component is a preferred digital assistant;
      determining that the first response from the first digital assistant component is flagged as a fallback response;
      overriding, responsive to the determination that the first response from the first digital assistant component is flagged as the fallback response, the first digital assistant component;
      selecting the second response from the second digital assistant component; and
      maintaining the first digital assistant component as the preferred digital assistant; and
    provide, responsive to the selection, the second response from the second digital assistant component to the computing device.

2. The system of claim 1, comprising:
  the data processing system to select the second response from the second digital assistant component based on a confidence score for the second response from the second digital assistant component.

3. The system of claim 1, comprising the data processing system to:
  determine a signal for the query; and
  select the ranking decision function from a plurality of ranking decision functions based on the signal.

4. The system of claim 1, comprising the data processing system to:
   determine a signal for the query; and
   select responses from the second digital assistant component based on the signal.

5. The system of claim 1, comprising:
   the data processing system to determine, based on the ranking decision function, to select the second response based on the second digital assistant component accessing data stored in memory of the computing device.

6. The system of claim 1, wherein the first response comprises one of calendar information or media content.

7. The system of claim 1, wherein the first digital assistant component executes independently of the second digital assistant component to generate the first response.

8. The system of claim 1, comprising:
   the data processing system to transmit the query to each of the plurality of digital assistants via an independent branch to cause the plurality of digital assistants to process the query in an overlapping manner.

9. The system of claim 1, comprising the data processing system to:
   receive the one or more data packets from the computing device via a streaming speech server configured to convert audio to text.

10. The system of claim 1, comprising:
    the data processing system to determine, based on the ranking decision function, to select the second response based on the first response being an audio-only response.

11. The system of claim 1, wherein the second response, received from the second digital assistant component, indicates that the query belongs to the domain.

12. The system of claim 11, wherein the second response, received from the second digital assistant component, further indicates that the domain is preferred by the second digital assistant component.

13. A system to coordinate overlapping processing of audio queries, comprising:
    a data processing system comprising at least one processor and memory to:
       receive, via an interface, one or more data packets corresponding to an audio signal detected by a sensor of a computing device;
       generate a query based on the audio signal received via the one or more data packets;
       transmit the query to a plurality of digital assistant components, including transmitting the query, using an application programming interface, to a first digital assistant component that executes on a remote server and that is administered by a first entity, and transmitting the query to a second digital assistant component that executes on the computing device and that is administered by a second entity, wherein the first entity is different from the second entity;
       receive a first response to the query from the first digital assistant component of the plurality of digital assistant components;
       receive a second response to the query from the second digital assistant component of the plurality of digital assistant components, wherein the first digital assistant component is authorized to access a database the second digital assistant component is prohibited from accessing, and the first digital assistant component and the second digital assistant component are configured to process the query at least partially in parallel;
       determine, based on a ranking decision function and a domain to which the query belongs, to select the second response from the second digital assistant component instead of the first response from the first digital assistant component, wherein determining to select the second response comprises:
          receiving the second response from the second digital assistant component prior to the first response from the first digital assistant component;
          determining that the second digital assistant component is not a preferred digital assistant component;
          determining that the first digital assistant is the preferred digital assistant;
          waiting, responsive to the determination that the second digital assistant component is not a preferred digital assistant and the first digital assistant is the preferred digital assistant, for the first response from the first digital assistant component;
          upon receipt of the first response from the first digital assistant component, determining that the first response is flagged as a fallback response; and
          selecting the second response based on the determination that the second digital assistant component is not the preferred digital assistant and the first response is flagged as the fallback response; and
       provide, responsive to the selection, the second response from the second digital assistant component to the computing device.

14. A method of coordinating overlapping processing of audio queries, comprising:
    receiving, by a data processing system comprising a processor and memory, one or more data packets corresponding to an audio signal detected by a sensor of a computing device;
    generating, by the data processing system, a query based on the audio signal received via the one or more data packets;
    transmitting, by the data processing system, the query to a plurality of digital assistant components, including transmitting the query, using an application programming interface, to a first digital assistant component that executes on a remote server and that is administered by a first entity, and transmitting the query to a second digital assistant component that executes on the computing device and that is administered by a second entity, wherein the first entity is different from the second entity;
    receiving, by the data processing system, a first response to the query from the first digital assistant component of the plurality of digital assistant components;
    receiving, by the data processing system, a second response to the query from the second digital assistant component of the plurality of digital assistant components, wherein the first digital assistant component is authorized to access a database the second digital assistant component is prohibited from accessing, and wherein the first digital assistant component and the second digital assistant component are configured to process the query at least partially in parallel;
    determining, by the data processing system, based on a ranking decision function and a domain to which the query belongs, to select the second response from the second digital assistant component instead of the first response from the first digital assistant component, wherein determining to select the second response comprises:

determining the first digital assistant component is a preferred digital assistant;

determining that the first response from the first digital assistant component is flagged as a fallback response;

overriding, responsive to the determination that the first response from the first digital assistant component is flagged as the fallback response, the first digital assistant component;

selecting the second response from the second digital assistant component; and maintaining the first digital assistant component as the preferred digital assistant; and providing, by the data processing system responsive to the selection, the second response from the second digital assistant component to the computing device.

15. The method of claim 14, comprising:

selecting the second response from the second digital assistant component based on a confidence score for the second response from the second digital assistant component.

16. The method of claim 14, comprising:

determining, based on the ranking decision function, to select the first response based on the first digital assistant component accessing data stored in memory of the computing device.

17. A method of coordinating overlapping processing of audio queries, comprising:

receiving, by a data processing system comprising a processor and memory, one or more data packets corresponding to an audio signal detected by a sensor of a computing device;

generating, by the data processing system, a query based on the audio signal received via the one or more data packets;

transmitting, by the data processing system, the query to a plurality of digital assistant components, including transmitting the query, using an application programming interface, to a first digital assistant component that executes on a remote server and that is administered by a first entity, and transmitting the query to a second digital assistant component that executes on the computing device and that is administered by a second entity, wherein the first entity is different from the second entity;

receiving, by the data processing system, a first response to the query from the first digital assistant component of the plurality of digital assistant components;

receiving, by the data processing system, a second response to the query from the second digital assistant component of the plurality of digital assistant components, wherein the first digital assistant component is authorized to access a database the second digital assistant component is prohibited from accessing, and wherein the first digital assistant component and the second digital assistant component are configured to process the query at least partially in parallel;

determining, by the data processing system, based on a ranking decision function and a domain to which the query belongs, to select the second response from the second digital assistant component instead of the first response from the first digital assistant component, wherein determining to select the second response comprises:

receiving the second response from the second digital assistant component prior to the first response from the first digital assistant component;

determining that the second digital assistant component is not a preferred digital assistant component;

determining that the first digital assistant is the preferred digital assistant;

waiting, responsive to the determination that the second digital assistant component is not a preferred digital assistant and the first digital assistant is the preferred digital assistant, for the first response from the first digital assistant component;

upon receipt of the first response from the first digital assistant component, determining that the first response is flagged as a fallback response; and selecting the second response based on the determination that the second digital assistant component is not the preferred digital assistant and the first response is flagged as the fallback response; and providing, by the data processing system responsive to the selection, the second response from the second digital assistant component to the computing device.

* * * * *